United States Patent
Takasu et al.

(10) Patent No.: US 6,907,567 B2
(45) Date of Patent: *Jun. 14, 2005

(54) SHIFTING INK IMAGES OVERLAID OVER TEXT IMAGES IN EMAIL DOCUMENTS

(75) Inventors: Eiji Takasu, Yokohama (JP); Katsuhiko Sakaguchi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,474

(22) Filed: Sep. 8, 1998

(65) Prior Publication Data

US 2002/0129068 A1 Sep. 12, 2002

(30) Foreign Application Priority Data

Sep. 9, 1997 (JP) .............................................. 9-243991

(51) Int. Cl.⁷ ................................................ G06F 7/00
(52) U.S. Cl. ....................... 715/541; 715/515; 715/526; 709/206; 382/182; 382/184; 382/185; 382/186; 382/187; 382/188
(58) Field of Search ................................ 715/515, 526, 715/530, 541, 500; 709/206; 345/179; 382/182–188; 707/526, 500; 207/206, 530

(56) References Cited

U.S. PATENT DOCUMENTS

| | | | | |
|---|---|---|---|---|
| 5,220,649 A | * | 6/1993 | Forcier | 707/541 |
| 5,528,739 A | * | 6/1996 | Lucas et al. | 707/526 |
| 5,590,257 A | * | 12/1996 | Forcier | 707/530 |
| 5,809,498 A | * | 9/1998 | Lopresti et al. | 707/6 |
| 5,831,615 A | * | 11/1998 | Drews et al. | 345/768 |
| 5,870,548 A | * | 2/1999 | Nielsen | 709/206 |
| 5,872,925 A | * | 2/1999 | Han | 709/206 |
| 5,889,506 A | * | 3/1999 | Lopresti et al. | 345/158 |
| 5,953,735 A | * | 9/1999 | Forcier | 707/541 |
| 5,999,648 A | * | 12/1999 | Yamaguchi | 382/189 |
| 6,108,688 A | * | 8/2000 | Nielsen | 709/206 |
| 6,151,611 A | * | 11/2000 | Siegel | 715/541 |
| 6,279,014 B1 | * | 8/2001 | Schilit et al. | 707/512 |
| 6,487,570 B1 | * | 11/2002 | Forcier | 707/541 |
| 6,779,178 B1 | * | 8/2004 | Lloyd et al. | 717/174 |

FOREIGN PATENT DOCUMENTS

JP         363052265 A    *   3/1988

OTHER PUBLICATIONS

Moser, S., MS Exchange Users Handbook, 29 Street Press, Mar. 1, 1997, p. 1–8.*

Linking Handwriting Annotation with Text, IBM TDB, vol. 32, No. 6A, pp. 452–454, Nov. 1989.*

Object Set Positioning Relative to the Page in a Multiple Data Editor, IBM TDB, vol. 27, No. 12, pp. 7061–7062, May 1985.*

Protected Block Selection and Automatic Keep for Graphic Objects in a Multiple Data Editor, IBM TDB, vol. 27, No. 10B, pp. 6006, Mar. 1985.*

* cited by examiner

*Primary Examiner*—Cesar B Paula
(74) *Attorney, Agent, or Firm*—Fitzpatrick, Cella, Harper & Scinto

(57) ABSTRACT

In a document in which a plurality of data items of different kinds are mixed, when one data item is edited, the relative positional relation to other data items is prevented from being destroyed, whereby information is prevented from becoming meaningless or from being changed. For example, when an edit is carried out on one data item, a deviation amount of that data item is derived and a shift process by the same amount is effected on the other data items, whereby the relative positional relation can be maintained among the data items.

31 Claims, 33 Drawing Sheets

FIG. 3
TRANSMISSION SIDE
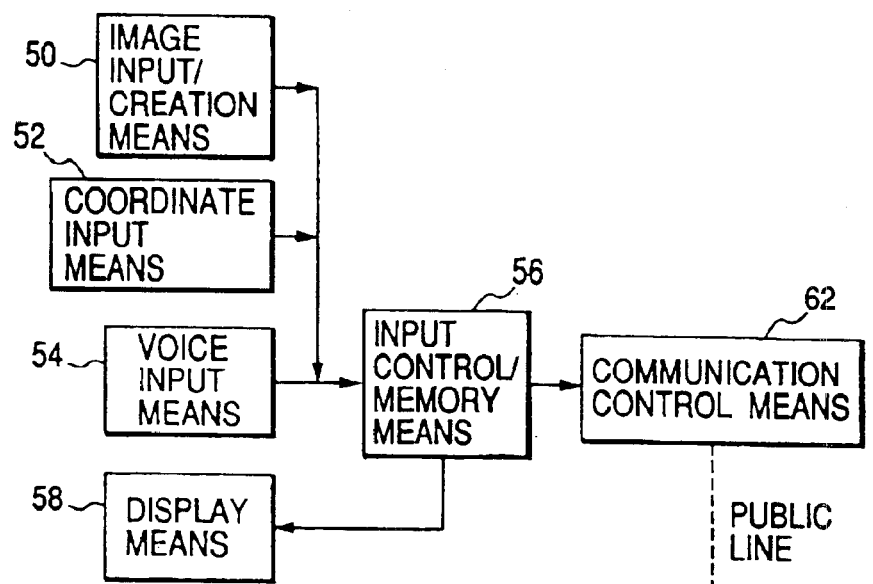
RECEPTION SIDE
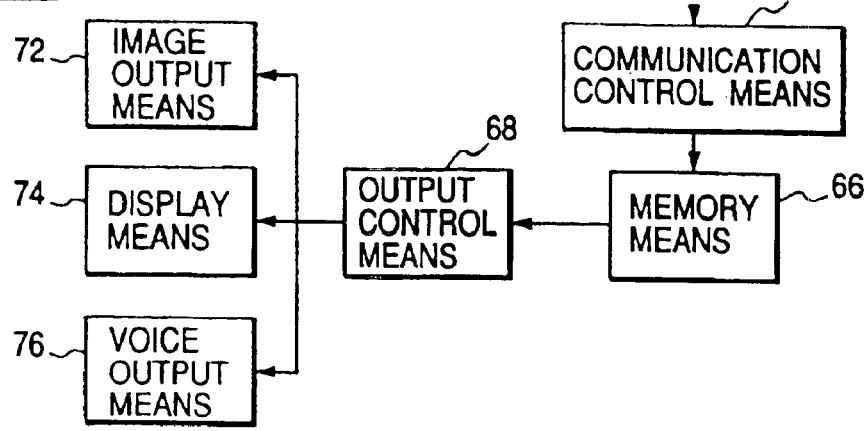

FIG. 28

MEETING/ATTENDANCE

SENDER(F): xxxx@xxx.xx.jp (F:
DESTINATION(T): xxxxx
SUBJECT(S): MEETING/ATTENDANCE PLEASE REGISTER ATTENDANCE ~2000
: i.e. ABSENT OR ATTENDING TODAY'S MEETING.

| ATTENDANCE | ABSENCE |
|---|---|

~2100

PS: THE MEETING WILL BE HELD IN MEETING ROOM A. ~2001

--- x x x x
x x x x @ x x x x . x x x . jp

~2002

SHIFTING INK IMAGES OVERLAID OVER TEXT IMAGES IN EMAIL DOCUMENTS

BACKGROUND OF THE INVENTION

1. Field of the Invention

The present invention relates to the technology for displaying both image information and locus information.

The present invention relates to the technology for editing electronic mail data.

2. Related Background Art

There were conventional devices to display a plurality of information pieces of different kinds in an overlapping state, but they had the problem that when one of the information pieces displayed in the overlapping state was edited, output positions of the other information pieces were not changed and thus the relative positional relation among the plurality of information pieces differed between before and after the edit.

When the relative positional relation was desired to be maintained, the information to specify the output positions of the other information pieces must be input in one information piece and this resulted in drawbacks of complicated information and heavy edit processing of information.

SUMMARY OF THE INVENTION

The present invention actualizes such technology that in a state where a plurality of data items of different kinds are displayed in a mixed state, when an edit process is effected on one data item, a deviation amount of data due to the edit is calculated and a shift process by the same amount is also effected on the other data items, whereby the relative positional relation is maintained among the data items.

The present invention also actualizes such technology that when an operator receives an electronic mail including data of image etc. in addition to a text and responds to or forwards this received mail, consideration is given to insertion of a quotation character string or the like into the text part, a deviation amount of the text defined by a format of this character string inserted is calculated, and a shift operation by the same amount is also effected on the image, whereby the data of the reply mail or the forwarded mail can maintain the data of the same contents as the received data.

BRIEF DESCRIPTION OF THE DRAWINGS

FIG. 3 is a diagram to show the functional structure of a system according to the present invention;

FIG. 28 is a diagram to show an example of a received mail; and

DETAILED DESCRIPTION OF THE PREFERRED EMBODIMENTS

The embodiments of the present invention will be described in detail by reference to the drawings.

Figure 1:
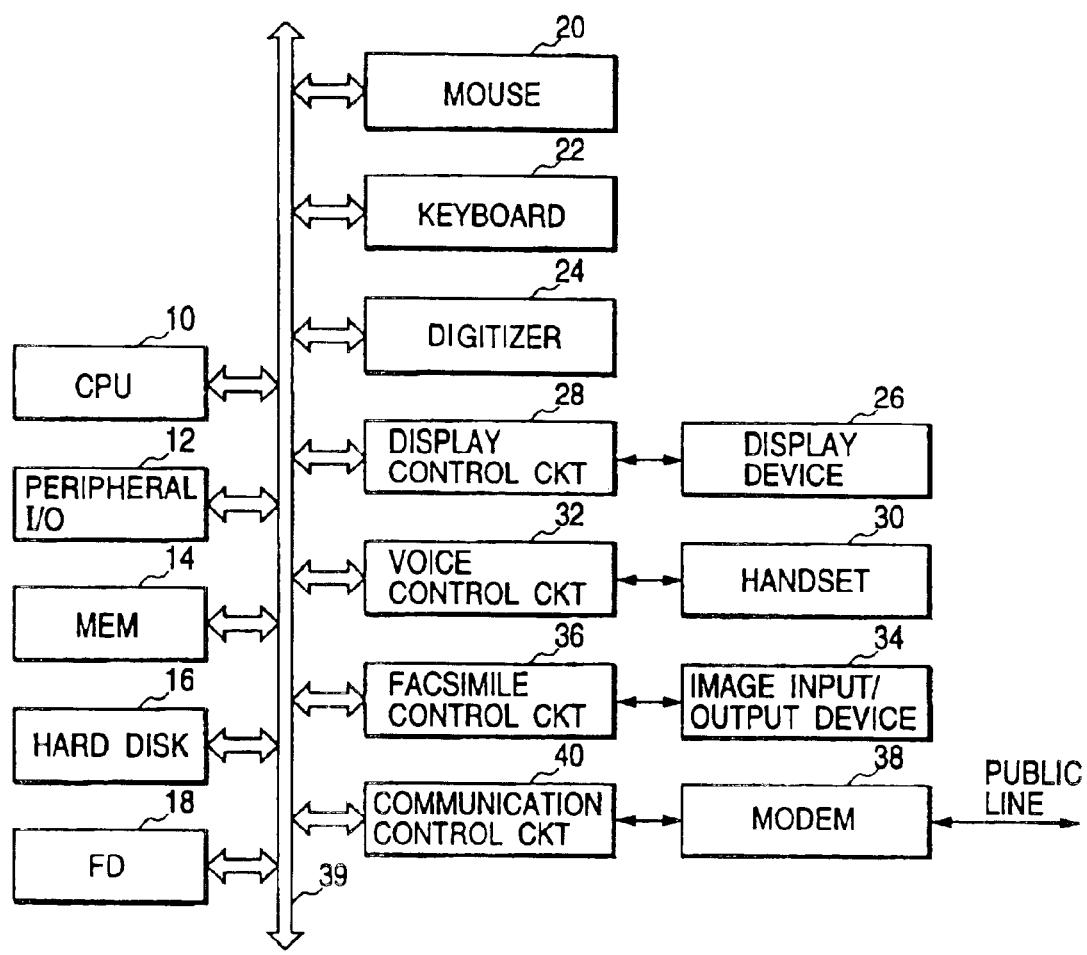
FIG. 1 is a diagram to show the schematic structure of an apparatus according to the present invention.

FIG. 1 is a block diagram to show the schematic structure of an embodiment of the present invention.

Numeral 10 designates a CPU (central processing unit) for controlling the whole of this apparatus, which controls execution of various processes associated with the present invention, according to control programs stored in memory 14, hard disk 16, floppy disk 18, and so on.

Numeral 12 denotes a peripheral I/O circuit for memory control and I/O control.

Numeral 14 represents a memory (MEM) comprised of ROM and RAM, which stores the control programs for the processes associated with the present invention, which will be described hereinafter with the flowcharts, and various parameters used for the respective processes and which is also used as a work area for storing data appearing in each process.

Numeral 16 indicates a hard disk, which stores the control programs of the processes associated with the present invention, which will be described hereinafter with the flowcharts, and the various parameters used for the respective processes.

Numeral 18 stands for a floppy disk, which stores the control programs of the processes associated with the present invention, which will be described hereinafter with the flowcharts, and the various parameters used for the respective processes. These data may be directly used or may be used after downloaded in the hard disk 16 or in the memory 14. Without having to be limited to the floppy disk, the memory may be another detachably mounted storage medium to this apparatus, for example, such as a CD-ROM or a magneto-optical disk.

Numeral 20 is a mouse, which is used for designating coordinates of a desired position on a display screen and also for effecting various select operations by clicking on its button.

Numeral 22 denotes a keyboard, and by depressing keys thereof, various characters, symbols, functions, etc. corresponding to the keys can be input, thereby permitting input or editing of text. This keyboard may be a soft keyboard displayed on the display screen, without having to be limited to the key input device.

Figure 2:
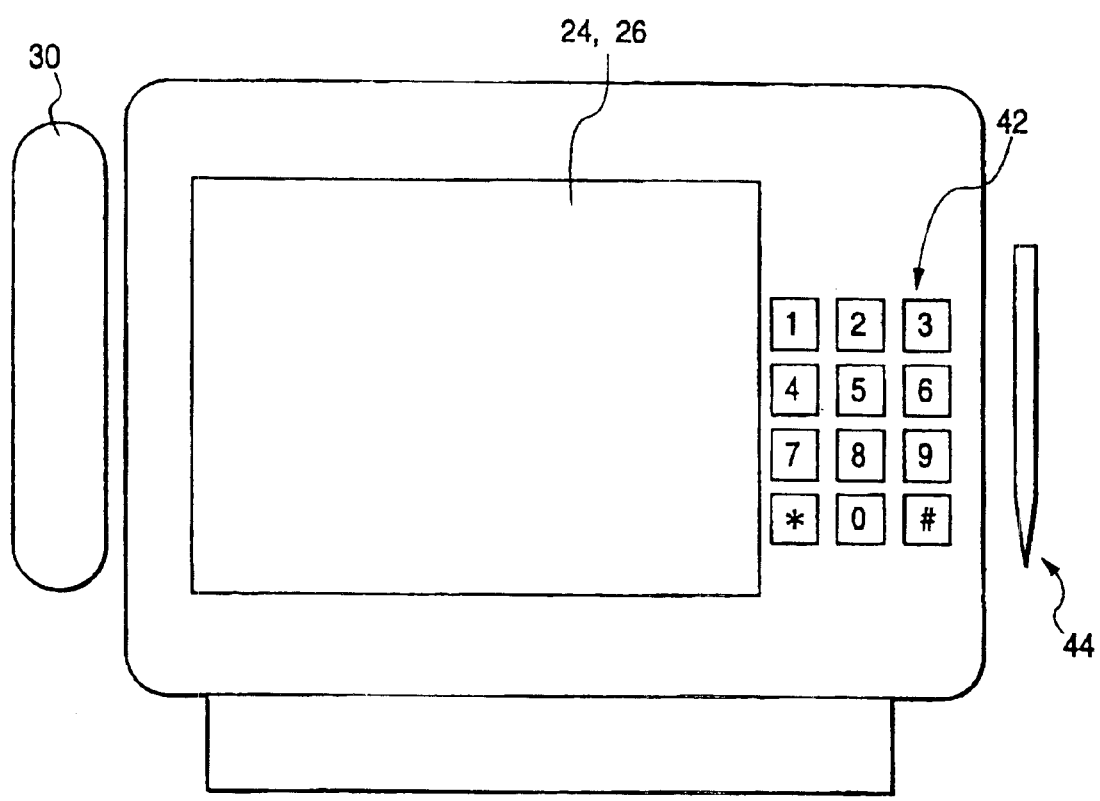
FIG. 2 is a diagram to show the appearance of an apparatus according to the present invention.

Numeral 24 represents a digitizer, through which coordinates of a desired position on the display screen can be input by moving a pen (44 in FIG. 2) on this digitizer. The present embodiment will be described in the form of an example in which the digitizer 24 is overlaid on the display device 26, as shown in FIG. 2, whereby information of an arbitrary point, a trace, or the like can be input as if to overlay it on an image displayed in the display device 24, but this coordinate input means is not limited to the example of the overlaid configuration on the display device. For example, the coordinate input means may be of a tablet type, in which the input device is placed on a desk separately from the display device and in which the coordinate information of a point, a trace, or the like can be input through the coordinate input device on the desk with observing the screen. If only rough data is handled, the coordinate input means can be a touch panel of a pressure sensitive type for designating an arbitrary point by finger.

Numeral 26 indicates the display device such as a liquid crystal display panel or a CRT, and 28 a display control circuit for making the display device 26 display a desired image under control of the CPU 10.

Numeral 30 denotes a voice input/output device composed of a microphone and a loudspeaker (for example, a handset), and 32 a voice control circuit for controlling input/output of voice through the voice input/output device 30 under control of the CPU 10. The voice input/output device 30 is not limited only to the integral form of the microphone and loudspeaker, but it may also be a microphone and a speaker separately provided.

Numeral 34 designates an image input/output device for facsimile transmission (i.e., including an image scanner and a printer), and 36 a FAX control circuit for controlling the image input/output device 34 under control of the CPU 10. The image input/output device 34 is not limited only to the integral device incorporating the image scanner as an image input device and the printer as an image output device, but it may also be the image input device and the image output device separately provided.

Numeral 38 indicates a modulator/demodulator (modem) for frequency-modulating a signal to be transmitted to a frequency band suitable for a telecommunication line and for demodulating a modulated signal from the telecommunication line, and 40 a communication control circuit for controlling connection and communication with the telecommunication line, including establishment of a communication protocol, under control of the CPU 10. The telecommunication line can be a line used for transmission of information, such as a public line or LAN. Numeral 39 stands for a data bus for exchange of data between the components.

FIG. 2 is a front elevation to show the appearance of the device in the present embodiment. The display device 26 and digitizer 24 are placed in the front and the handset 30 on the left side. A ten key 42 for input of telephone number is located on the right side. Numeral 44 designates an input pen of the digitizer 24.

FIG. 3 is a diagram to show the functional structure of a system according to the present embodiment, and the functions are carried out by the components disclosed in FIG. 1.

Image input/creation means 50 outputs to input control/memory means 56 data of an image read through the image input/output device 34 or an image of a document including a text created using the keyboard etc. by wordprocessor or plotter software to operate on this apparatus. Coordinate input means 52 is the digitizer 24, which calibrates and times the coordinates input through the pen 44 to output corrected coordinate values to the input control/memory means 56. Voice input means 54 performs analog-digital conversion of a voice signal input through the handset 30 to output a digital signal to the input control/memory means 56. The outputs from these means 50, 52, 54 are supplied to the input control/memory means 56 to be stored as data.

When a message by voice and/or locus is added to the input image, the input control/memory means 56 makes display means 58 (i.e., the display device 26) display the input image, the details of which will be described hereinafter. While observing the display screen, the user inputs an arbitrary locus through the digitizer 24 or through the mouse 20 and/or inputs the voice through the handset 30.

Each data of the image, voice, and locus input and stored in the MEM 14 is transmitted through the public line under control of communication control means 62.

Communication control means 64 on the reception side receives the information through the public line and writes the received data in memory means 66. In response to a disclosure request from the user on the reception side, output control means 68 reads the data of received image specified by the user from the memory means 66 and supplies the data to image output means 72 (the printer section of the image input/output device 34) and/or to display means 74 (the display device 26 and display control means 68). When the data is accompanied by voice/locus data, the output control means 68 first supplies the received image to the display means to make the display means display the received image and also supplies the locus data to the display means 74 and/or the voice data to voice output means 76 in accordance with a reproduction instruction of voice/locus given by the user. This causes the locus input on the transmission side to be displayed at the same position and at the same speed as those of the input locus on the transmission side so as to be overlaid on the received image displayed on the display means 74. In synchronism with this, the voice is reproduced at the same timing as that of the voice input together with the locus. For printing the received image on paper, the image output means 72 is used.

Although in FIG. 3 the functions of input and output of image, coordinates, voice, and text are illustrated separately on the transmission side and on the reception side, the apparatus in the present embodiment is ready for both transmission and reception as shown in FIG. 1 and FIG. 2, so that the same apparatus can perform both input and output of image, coordinates, voice, and text. Accordingly, after inputting and editing the image, coordinates, voice, and/or text on the transmission side, the user can check the data by reproducing the image, locus, voice, and/or text having been entered, by use of the display device, the handset, or the image output device; on the reception side to receive the data, the user can not only reproduce the received data, but also input an additional image, coordinates, voice, and/or text in the received data or edit the received data by use of the mouse, keyboard, digitizer, handset, or image input device.

The processes of the present embodiment will be described in detail with examples of flowcharts and display screens in respective states.

Figure 4:
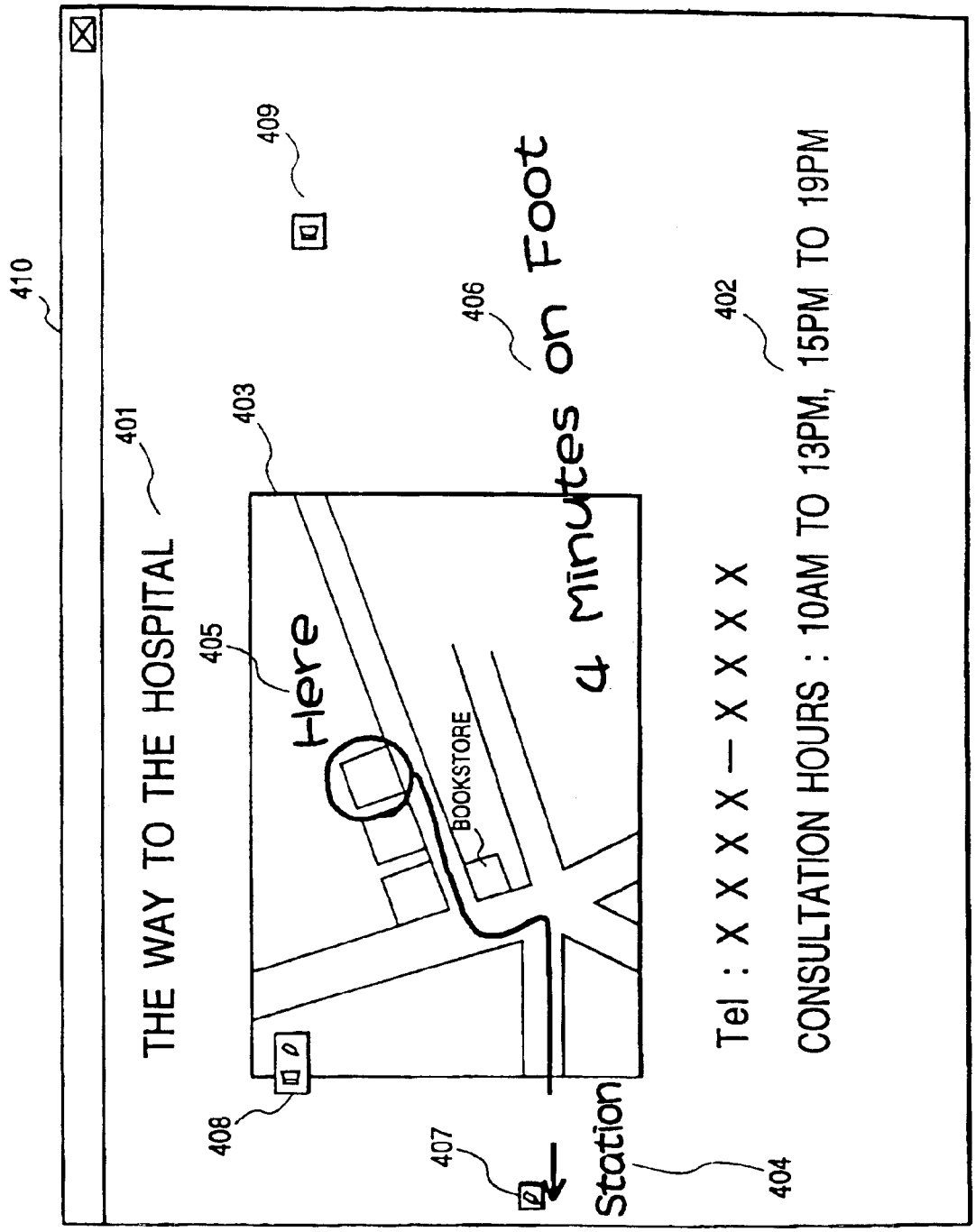
FIG. 4 is a diagram to show an example of a document prepared in an embodiment of the present invention.

FIG. 4 illustrates an example of a document prepared for explaining the way to a hospital, in which in a document window 410 there are displayed a text 401 of explanation entered through the keyboard 22, "The way to the hospital"; a text 402 entered through the keyboard 202, to describe the telephone number and consultation hours; an image 403 of a map around the hospital, entered through the scanner section of the image input/output device 34 or from another terminal equipment through the public line; loci 404 to 406 entered through the mouse 20 or through the digitizer 24; and icons 407 to 409 to indicate entries of dynamic locus information and voice and to enable to designate reproduction of a dynamic locus or sound by clicking either one of them by the mouse 20 or by the digitizer 24. The "clicking" means depressing the button of the mouse 20 or dropping the pen down onto the digitizer 24, and it is determined according to the clicking that the user selected the information on the display screen corresponding to the coordinates of the position of the mouse cursor at that time or the coordinates of the position of pen down, for example an object displayed at that position.

The dynamic stroke herein, though will be detailed hereinafter, is a stroke that holds not only the coordinate information of stroke but also time information about input time of each coordinate information and that thus enables reproduction of a locus at the as-input speed according to the time information.

By turning the microphone (voice input means) on upon entry of the dynamic stroke, an explanation by voice can also be entered in addition to the coordinate information entered by the locus. For example, upon entry of the locus 405 of FIG. 4, the user makes a voice of "this junction of five roads" at the time when the locus reach the junction of five roads and also makes a voice of "turn to the right at the corner of the bookstore" at the time of input of the locus turning at the corner of the bookstore, which enables to input information easier to understand.

When complete reproduction of the dynamic loci and voice is designated to the document thus prepared (FIG. 4), (1) the locus 405 and locus 406 are reproduced as they were drawn, together with the voice of "Turn to the left at an acute angle at this junction of five roads, turn to the right at the corner of the bookstore that is seen right, and find the hospital as the third building on the left side. You will take about four minutes on foot from the station to the hospital."; (2) the locus 404 is reproduced as it was drawn; and (3) the voice of "Your reservation time is eleven o'clock and please be on time" is reproduced.

The process for preparing this document will be described according to the flowchart of FIG. 5.

Figure 7:
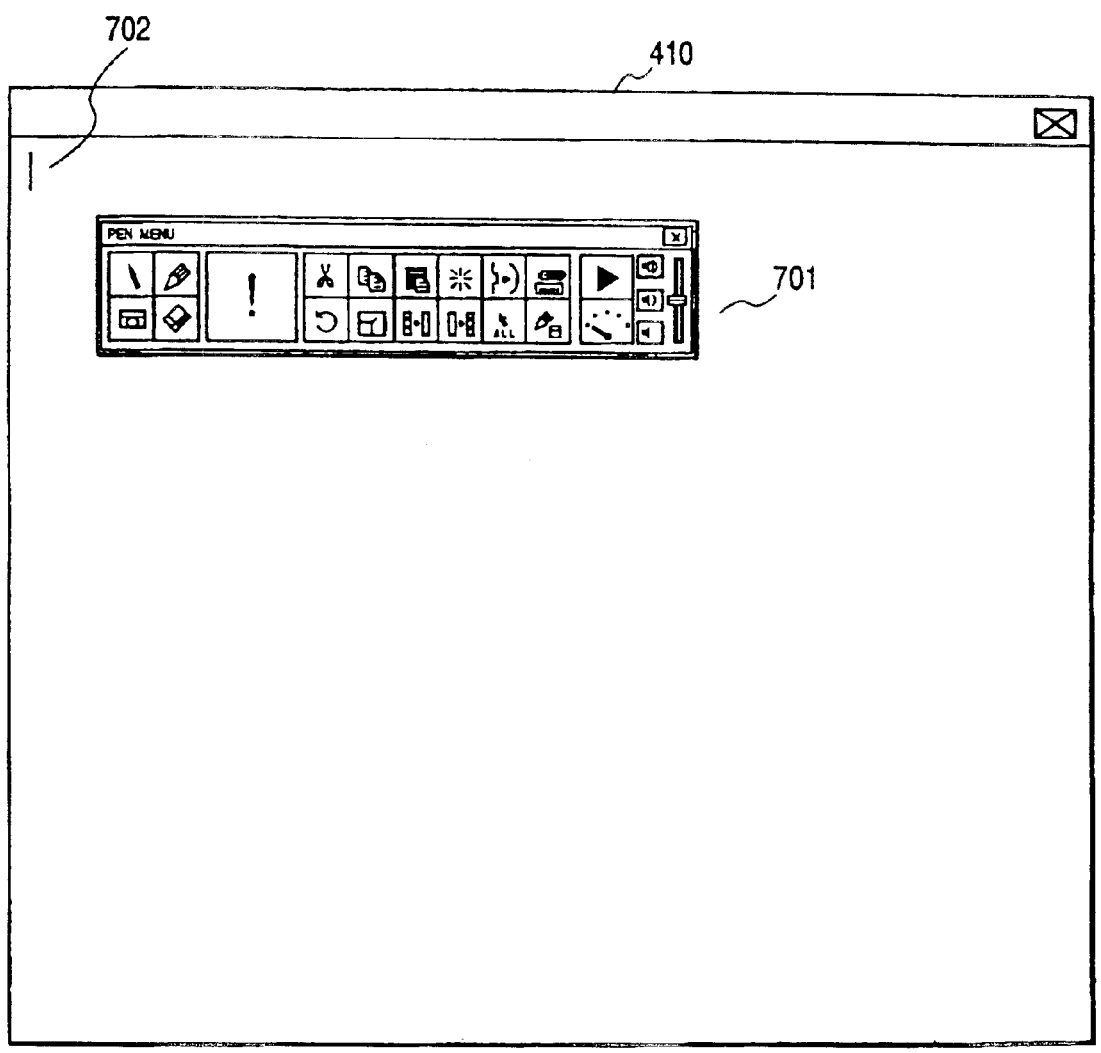
FIG. 7 is a diagram to show an example of a document preparation window in an edit mode.

The preparation of document is carried out in the document window 410 displayed on the display screen of the display device 26. When the document window is opened, a parameter to indicate a current mode stored in the MEM 14 is initialized (S2). Occurrence of an event is detected by whether some information is intended to be entered through the input device, i.e., through the mouse 20, keyboard 22, digitizer 24, microphone 30, or image input means 34 (S4), and thereafter a kind of the event detected will be determined in S6 to S10. If in S6 the event is determined to be an end event, for example, by clicking on the end button on the display screen through the mouse 20 or the digitizer 24, this operation will be terminated. If in S8 the event is determined to be an entry of character code from the keyboard 22, the process will move to a character input routine of S26. In this character input routine, characters entered from the keyboard 22 are successively displayed in the form pursuant to the document format stored in the memory 14, at the position of the cursor 702 for character input displayed on the document preparation window 410 of FIG. 7. A character group entered through the keyboard 22, i.e., text data is stored in the MEM 14.

When in S10 the event is determined to be an instruction of mode switch given by clicking a button in a pen menu 701 displayed in the document preparation window 410 through the mouse 20 or through the digitizer 24, the parameter to indicate the current mode in the MEM 14 is reset to a designated mode (S12) and a menu screen established for that mode is displayed (S14).

Figure 8:
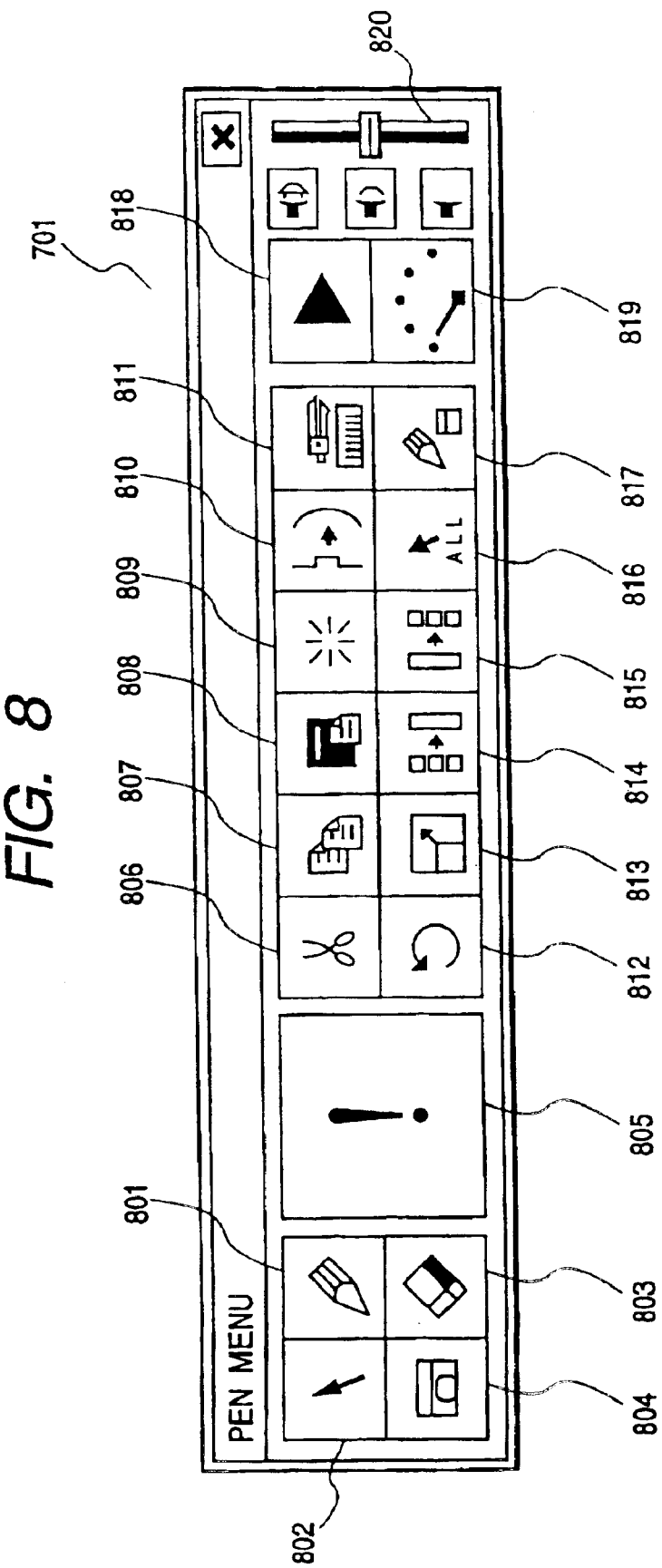
FIG. 8 is a diagram to show an example of a pen menu in the edit mode.

The pen menu 701 displayed in the edit mode is illustrated in FIG. 8, and each of the buttons will be described. This pen menu can be moved to an arbitrary position and displayed there by dragging a title bar, as a normal dialog box can. The MEM 14 always holds the coordinate information to indicate the displayed position of the pen menu and the positions of the respective buttons, and on the occasion of determination of the kind of the mode designated in S10, this coordinate information stored in the MEM 14 is compared with the coordinate information of the position clicked by the mouse 20 or by the digitizer 24, whereby a mode corresponding to the button at the click position is determined to be the designated mode.

The button 801 is a draw mode instruction button for providing an instruction of switch to a draw mode, the button 802 an edit mode instruction button for providing an instruction of switch to an edit mode, the button 803 an eraser mode instruction button for providing an instruction of switch to an eraser mode, the button 804 a record pen instruction button for providing an instruction of switch to a record pen mode, the button 805 an undo instruction button for providing an instruction for canceling a previous operation and restoring the status before the previous operation, the button 806 a cut button for providing an instruction for cutting data in a range designated, out of the screen, the button 807 a copy button for providing an instruction for holding data in a range designated, in another area while leaving the data on the screen, the button 808 a paste button for providing an instruction for displaying the data in the range specified by the cut or copy operation at a position designated, the button 809 a clear button for providing an instruction for deleting data in a specified range from the screen, the button 810 a smooth button for providing an instruction for smoothing a coordinate string of locus data designated, the button 811 an engross button for providing an instruction for engrossing locus data specified to a shape designated out of a straight line, a circle (an ellipse or a complete circle), a triangle (normally, an isosceles triangle or a regular triangle), and a rectangle (a rectangle or a square), the button 812 a rotate button for providing an instruction for changing data in a designated range into a rotated display state, the button 813 a resize button for providing an instruction for displaying a change instruction button to change the size of data in a designated range and for changing the size of the data according to the operation of the button, the button 814 a group button for providing an instruction for grouping plural items of stroke data designated, the button 815 an ungroup button for providing an instruction for ungrouping plural items of stroke data designated into separate independent data items not grouped, the button 816 a full select button for providing an instruction for selecting all data composing one document displayed in the document preparation window 410, the button 817 a pen set button for providing an instruction for displaying a screen for changing an attribute of the pen for inputting a locus, i.e., an attribute of the locus (a color of line and a thickness of line), and the button 818 a reproduction start button for providing an instruction for reproducing the dynamic stroke and voice data. When this reproduction start button 818 is clicked, the dynamic stroke and voice data included in that document is reproduced in the input order or plural objects selected are reproduced in a selected order. Numeral 819 indicates a volume window to display an image of a swinging needle, thereby indicating the advance of input of voice data or the advance of reproduction, and numeral 820 a volume adjust bar to indicate the volume of reproduced voice and to permit the user to drag the bar up and down to change the position, thereby adjusting the reproduction volume of voice.

Figure 9:
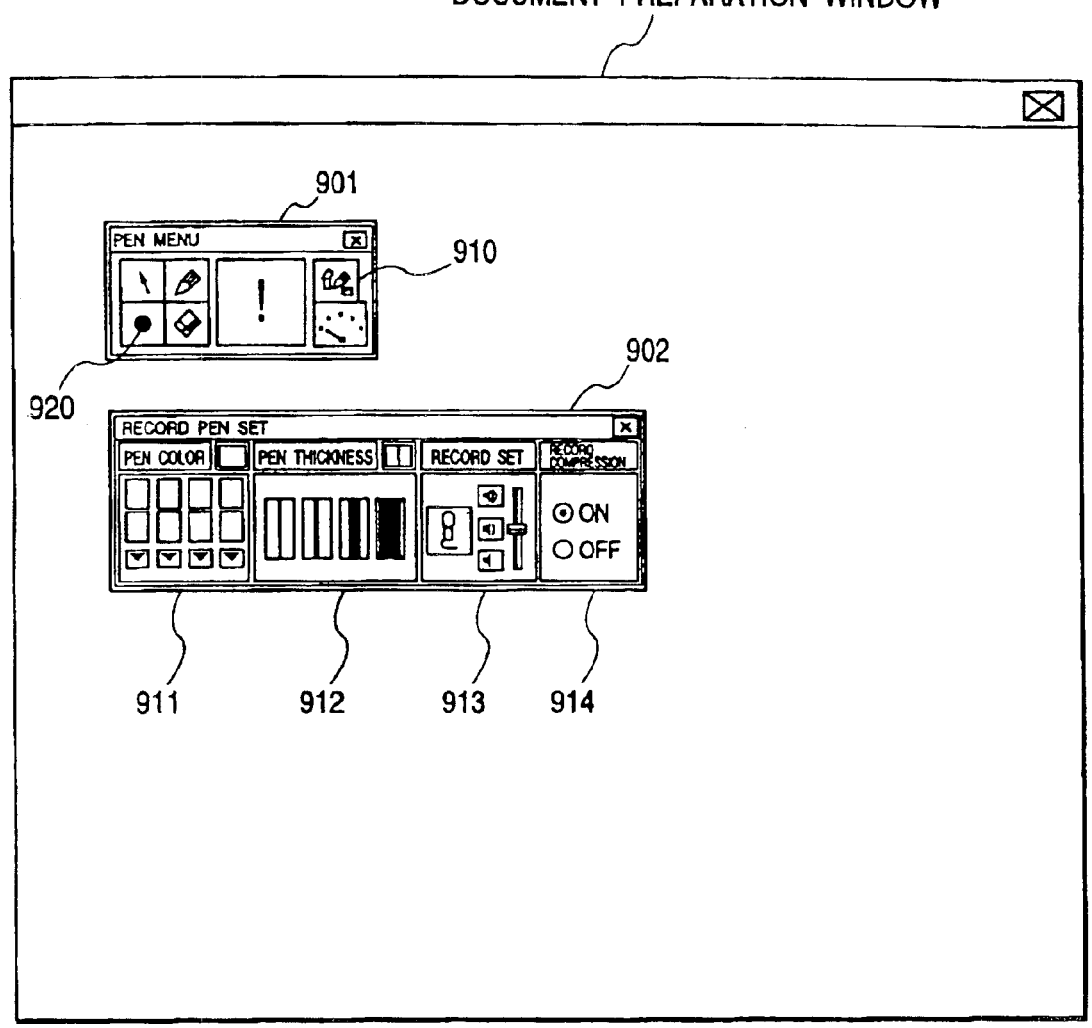
FIG. 9 is a screen upon setting of attributes of a record pen.

When the current mode is not the edit mode but either one of the draw mode, the eraser mode, and the record pen mode, the pen menu at that time is different from the one shown in FIG. 8 but is one like the pen menu 901 shown in FIG. 9, which is composed of the draw mode button 801, the edit mode button 802, the eraser mode button 803, the record start button 920 for giving an instruction for starting sound recording, the undo button 805, the volume window 819, and the record pen set button 910 for giving an instruction for displaying the screen for changing the attribute of the pen for input of a dynamic locus, i.e., the attribute of the dynamic locus (color of line and thickness of line), and the attribute of voice (volume and presence/absence of compression process). Once the record start button 920 is clicked, a record end button 921 is displayed instead of the record start button, however.

When it is determined in S10 that either one of the draw mode button 801, the edit mode button 802, the give an instruction of on or off of compression of voice. The operator sets arbitrary attributes on this record pen set dialog box 902 by use of the mouse 20 or the digitizer 24 and thereafter starts input. The attributes set in the record pen set dialog box 902 are held in the MEM 14 and the attribute data in the MEM 14 is also changed every reset of attributes.

Figure 6:
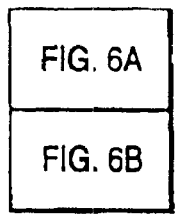
FIG. 6 which is comprised of FIGS. 6A and 6B is a flowchart of processing in a record pen mode.
Figure 6A:
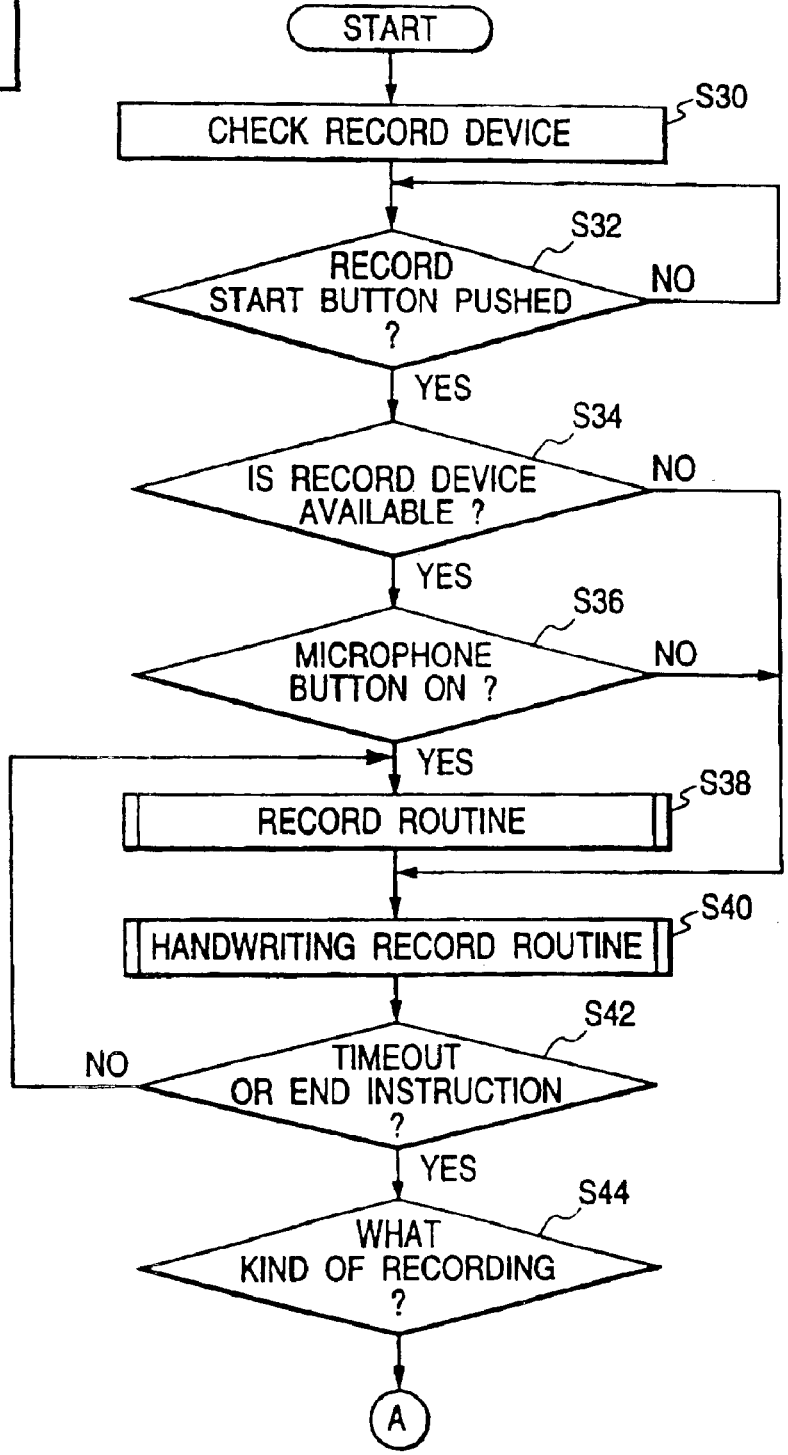
Figure 6B:
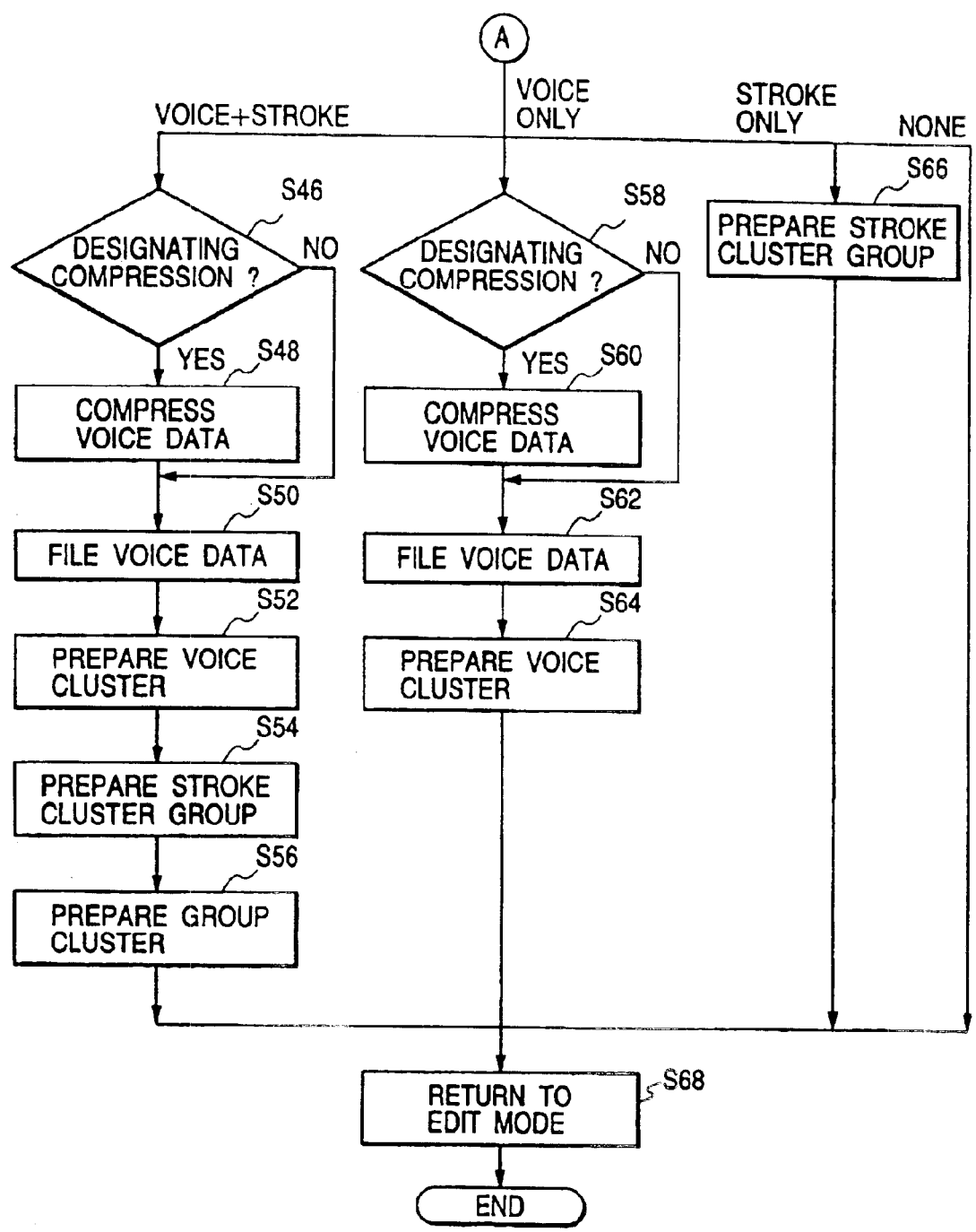

FIGS. 6A and 6B illustrate the flowchart of the process in the record pen mode of S24, and the following explains the process for entering data of plural objects comprised of dynamic stroke or voice data. Here, an "object" denotes an object including all data entered during a period between a press of the record start button 920 and a press of the record end button 921. The icons 407 to 409 of FIG. 4 are displayed for every object.

Now, let us explain the input process of dynamic stroke and voice data by the record pen, referring to the flowchart of FIGS. 6A and 6B.

Figure 10:
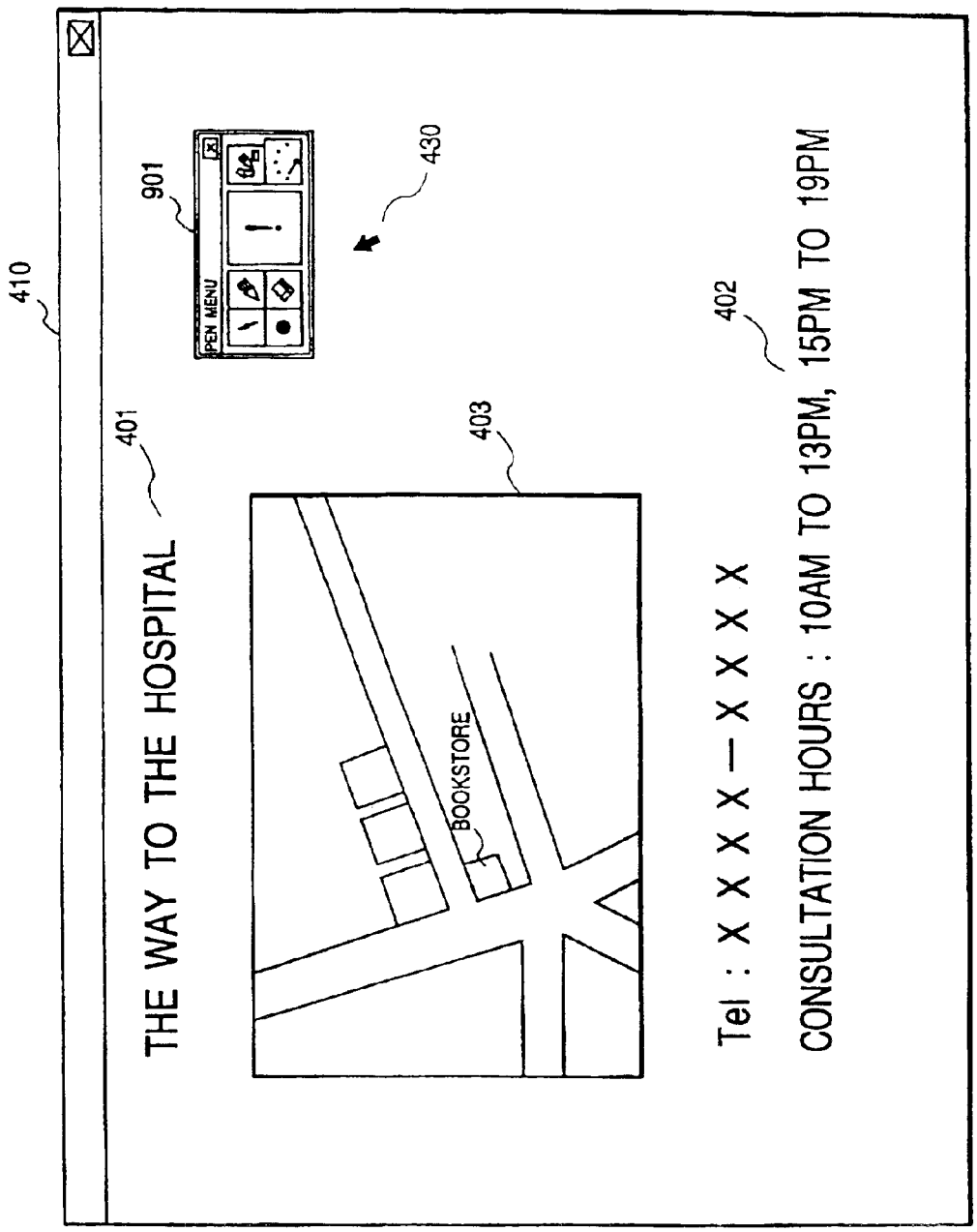
FIG. 10 is a diagram to show an example of the screen before input of a dynamic stroke with the record pen.

FIG. 10 illustrates the screen resulting from such operations in the character input routine of S26 that the texts 401 and 402 are entered through the keyboard 22, that the image 403 of the map near the hospital is entered, the image 403 having been entered from the image input device 34 or from another terminal equipment through the telecommunication line, and that the pen menu 901 is displayed based on designation of the record pen mode. Here, the image is handled in the same level as characters, and by designating input of image in the character input routine, the position to indicate the character cursor 702 is displayed as a reference position of the image. Therefore, the display position of image also varies with an edit of character string (text). When the record pen mode is designated, the process shown in the flowchart of FIGS. 6A and 6B starts and it is checked whether the recording device is mounted on the present apparatus (S30). If it is determined here that no recording device is mounted on the apparatus, the operator is notified that no voice recording device is mounted, by displaying a dialog of "No voice recording device is found. Only recording of handwriting is available." The screen after this is the one illustrated in FIG. 10.

After the determination of whether the recording device is mounted or not in S30, the processor awaits a click on the record start button 920 (S32), and with a click it is determined whether the recording device is in an available state (S34). This determination is to determine whether the recording device, which was determined to be mounted in S30, is in a ready state at the time of the click on the record start button. If the recording device can also be used in a plurality of applications etc. including the present application, the determination of S34 can be made by providing a flag to indicate whether or not the recording device is in use and checking this flag.

When the recording device is determined to be available in S34, the processor checks whether the microphone button (a switch button for on/off of record) is on in the record set area 913 in the record pen set dialog box 902, by reading it from the MEM 14 (S36). When the microphone button is on, the record routine 38 is started (S38) and the process of S38 for recording the voice data in the MEM 14 is carried on until it is determined in S42 that an instruction of end is given by a click on the record end button 921 or until a timeout occurs by a decision that the recording time is over a time preliminarily determined and held as a predetermined time in the MEM 14.

When handwriting data is entered through the mouse 20 or the digitizer 24 with the start of the record routine, a routine for recording the input handwriting in the MEM 14 is carried out repetitively (S40).

When the recording device is determined to be unavailable in S34 or when the microphone button is determined to be off in S36, the record routine of S38 is shipped, but the handwriting record routine of S40 is repetitively carried out before an affirmative decision is made in S42.

When it is determined in S42 that an instruction of end is given by a click on the record end button 921 or that a timeout occurred over the time preliminarily determined and held as a predetermined time in the MEM 14, it is determined what kind of data was recorded in S38 and S40 (S44), and the program branches to processes in the case of the both voice data and stroke data, in the case of only the voice data, and in the case of only the stroke data. In the example shown in FIG. 4, the object corresponding to the icon 408 includes the both voice data and stroke data, the object corresponding to the icon 407 includes only the stroke data, and the object corresponding to the icon 409 includes only the voice data. It is possible to notify the operator of a kind of data of each object by using the different types of icons according to the data kinds of objects.

When the kind of recording is the voice data and stroke data, the processor reads a parameter to indicate whether compression is designated in the record compression area 914 in the record pen set dialog box 902 out of the MEM 14 (S46). When compression is designated, compression is carried out of the voice data stored in the MEM 14 in S38 (S48). When compression is not designated, the processor proceeds to S50.

Figure 11:
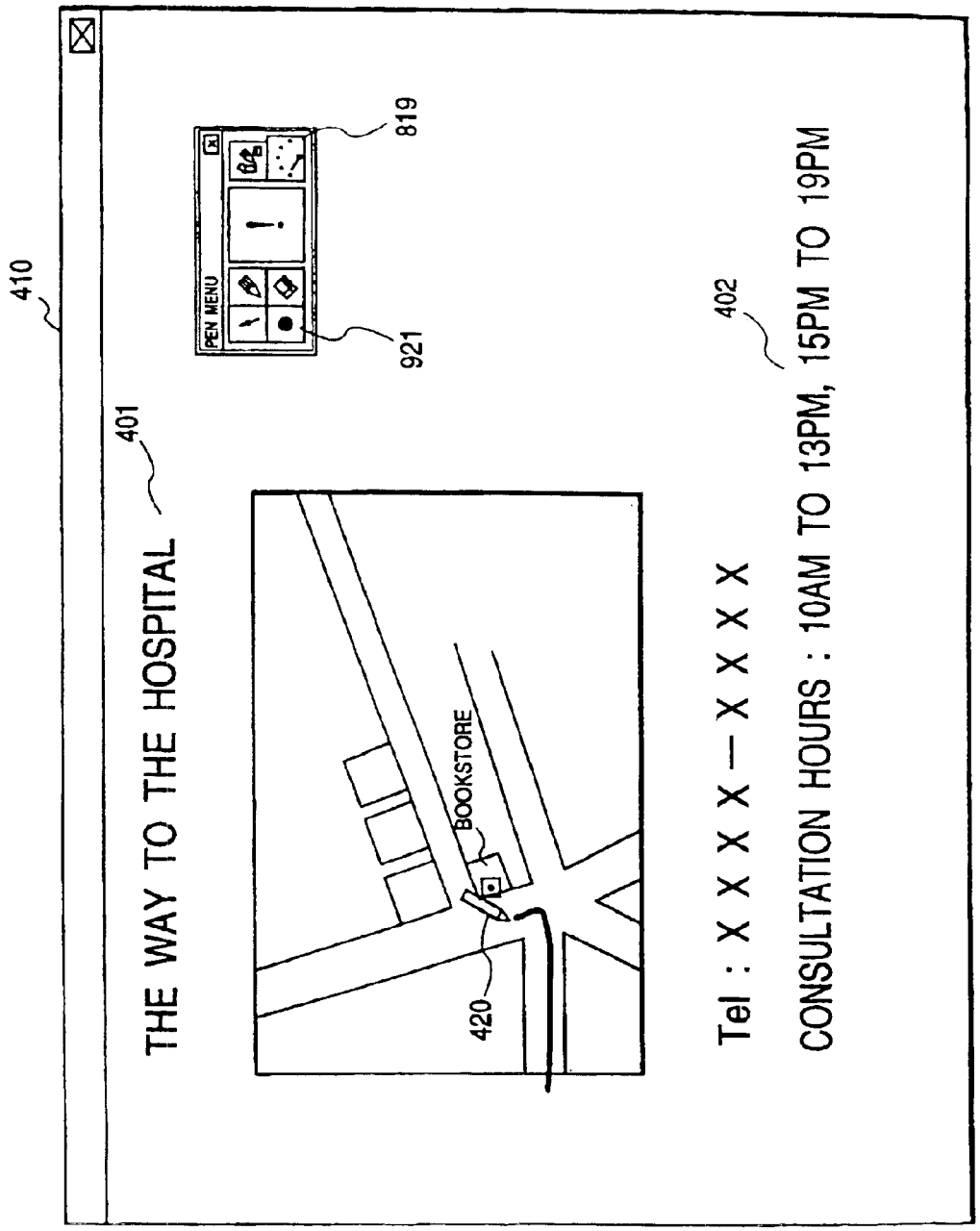
FIG. 11 is a diagram to show an example of the screen in the middle of input of a dynamic stroke.
Figure 12:
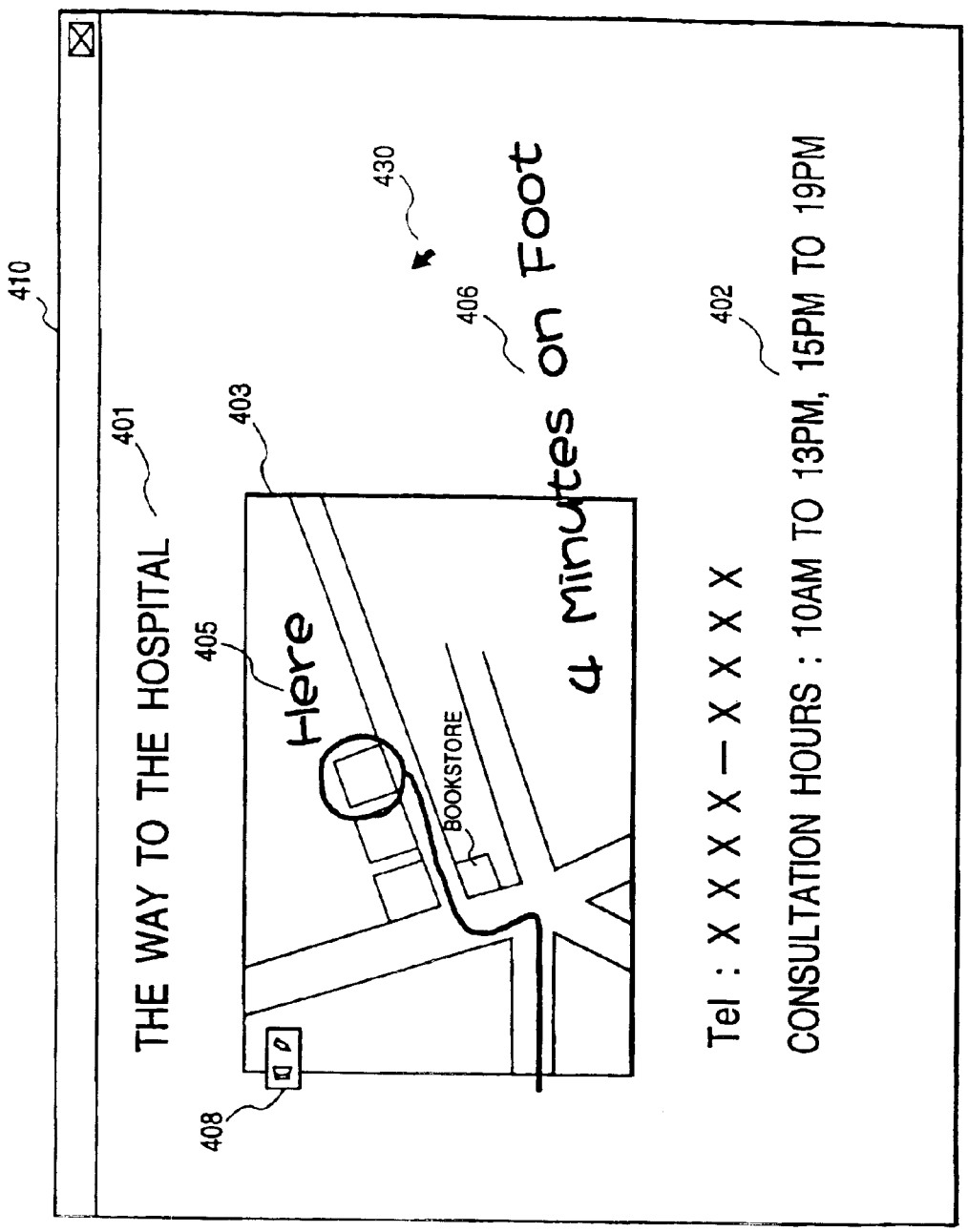
FIG. 12 is a diagram to show an example of the screen after completion of data input of one object.

With the voice data and stroke data (handwriting data) stored in the MEM 14 in S38 and S40, the processor performs steps to file the voice data (S50), to prepare a voice cluster (S52), to prepare a stroke cluster group (S54), to prepare a group cluster (S56), and then to return to the edit mode (S68). FIG. 11 shows the display screen in the middle of input of the stroke data and voice data before the affirmative decision in S42 and FIG. 12 shows the display screen after the affirmative decision in S42. In FIG. 11, the mouse cursor or the cursor to indicate the position designated by the pen is of the shape like 420 during the period between the click on the record start button 920 and the click on the record end button 921 and the record end button 921 is displayed in place of the record start button 920 in the pen menu. During recording of the voice data, the display is in a state in which the needle of the volume window 819 is swinging. In FIG. 12, because the both stroke data and voice data are entered, the screen displays the icon 408 to indicate presence of the both data recorded. The display position of the icon 408 is the left upper part of the circumscribed rectangle around the stroke data. It is, however, noted that the display position of the icon is not limited to this position, but the display position of the icon may be the right upper part of the circumscribed rectangle around the stroke, a position of coordinates of first input, or any position determined so as not to overlay the stroke or the image and text below it. When only the voice data is given without input of stroke data, the icon is displayed at the default position.

When the kind of recording is determined to be only the voice data in S44, the processor performs the steps of S58 to S64 and then returns to the edit mode (S68). The processes of S58 to S64 are the same as those of S46 to S52.

When the kind of recording is determined to be only the stroke data in S44, the processor performs the process of S66, which is the same as S54, and then returns to the edit mode (S68).

When it is determined in S44 that no data is recorded, the program also returns to the edit mode (S68).

Figure 13:
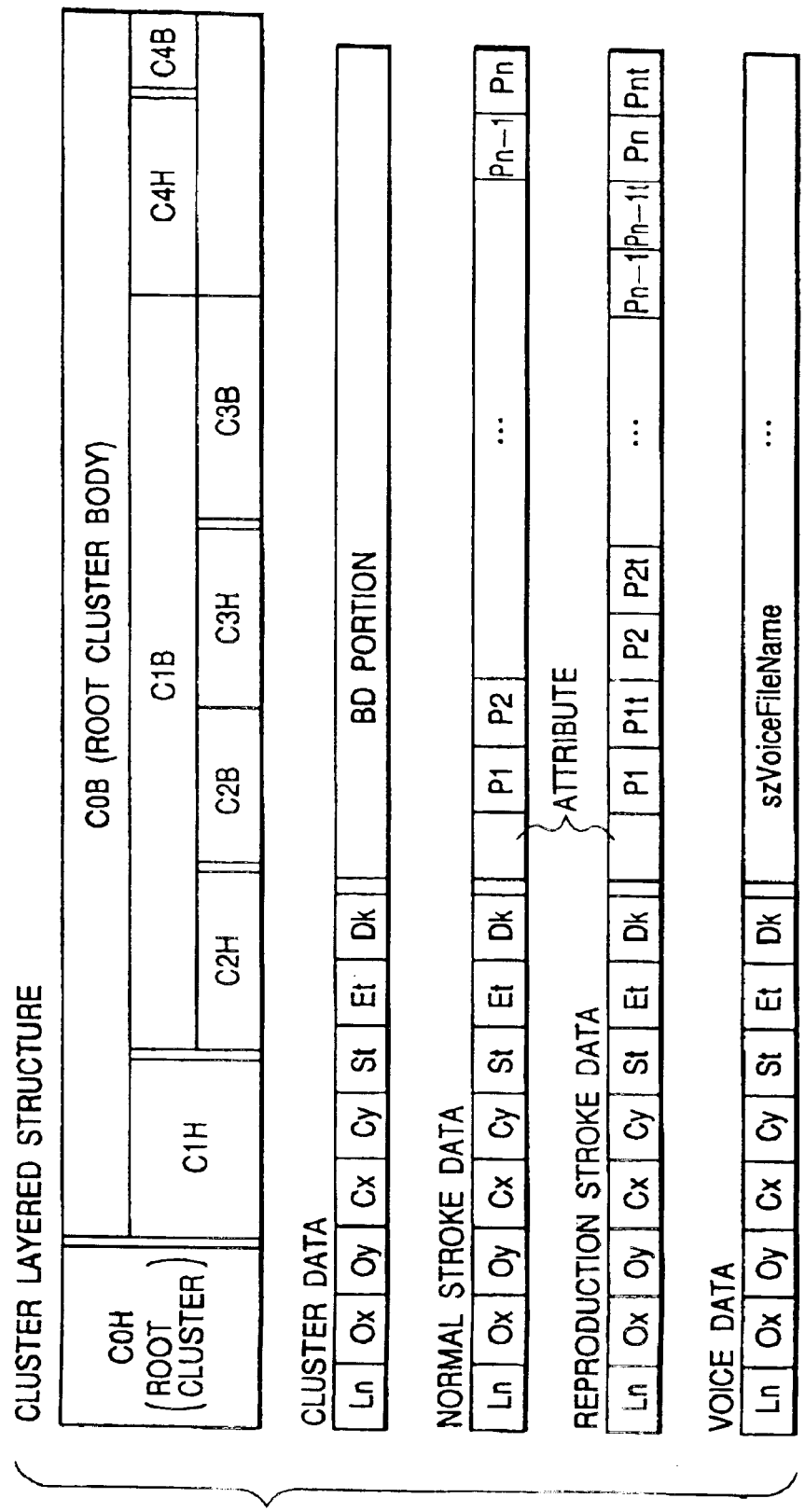
FIG. 13 is a diagram to show data structures.

FIG. 13 shows the structures of the data prepared by the processes of S50 to S66 and the data entered in the draw mode of S18. These data is stored in the MEM 14.

The cluster data is the data structure stored in the MEM 14 where the stroke data and voice data are grouped to be handled as one object. For example, grouping of plural strokes drawn in the draw mode includes automatic grouping of those strokes where drawing intervals of the strokes (temporal intervals from pen up to pen down or positional intervals of the strokes) are smaller than a default value preliminarily determined and held as a parameter in the MEM 14, a posteriori grouping which is effected on plural items of data selected by the operator at the time of clicking on the group button 814, and so on.

The normal stroke data is the data structure where one stroke drawn in the draw mode is stored as single data in the MEM 14.

The reproduction stroke data is the data structure where the data of the stroke entered in the record pen mode, which was expressed previously as a dynamic stroke, is stored in the MEM 14, including not only the coordinate data of the stroke but also the time information on entry of each coordinate position. However, the data of the all dynamic strokes included in one object is not held, but only data concerning one stroke therein is held.

The voice data is the data structure where the voice entered in the record pen mode is stored in the MEM 14.

Each of the cluster data, the normal stroke data, the reproduction stroke data, and the voice data is composed of a portion called a header including Ln (the size of the whole data), Ox (an x-coordinate of the left upper part of the circumscribed rectangle of data), Oy (a y-coordinate of the left upper part of the circumscribed rectangle of data), Cx (a horizontal width of the circumscribed rectangle of data), Cy (a vertical width of the circumscribed rectangle of data), St (an input start time of data), Et (an input end time of data), and Dk (a kind of data stored in the body part); and a portion called a body, including the data itself. In the body part, the normal stroke data includes the attribute data concerning the thickness and color of stroke, and a string of n coordinate points Pi (i=1 to n); the reproduction stroke data includes the attribute data concerning the thickness and color of stroke, a string of n coordinate points Pi (i=1 to n), and n pieces of time information Pit (i=1 to n) to indicate the time of entry of each coordinate point; and the voice data includes szVoiceFileName which is a file name storing the voice data.

An example of cluster data constructed in the layered structure is illustrated as a cluster layered structure. C0H represents the header part of the root cluster and C0B the body part of the root cluster, this C0B including cluster C1 and cluster C4. C1H denotes the header part of the cluster C1, C1B the body part of the cluster C1, C4H the header part of the cluster C4, C4B the body part of the cluster C4, and the cluster C1 includes cluster C2 and cluster C3. C2H indicates the header part of the cluster C2, C2B the body part of the cluster C2, C3H the header part of the cluster C3, and C3B the body part of the cluster C3.

Depending upon whether data of each cluster is the reproduction stroke data or the voice data, associated data is stored in the header part and in the body part.

Coordinate values of each data stated above are those along the coordinate axes with the reference at the left upper part of the document upon entry of data, and the reference coordinate axes are coincident with those of the text data.

Figure 5:
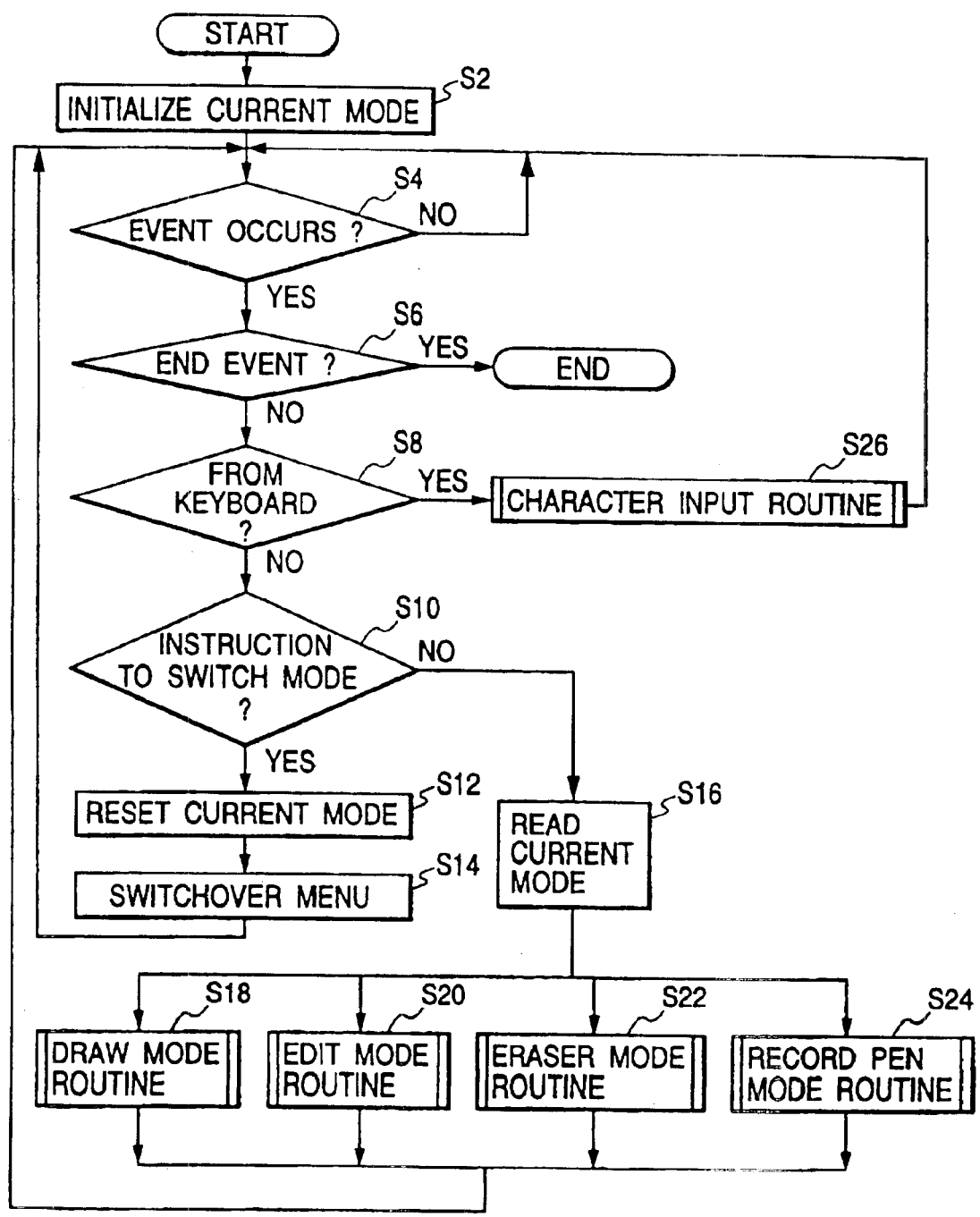
FIG. 5 is a flowchart of the whole processing flow for preparing the document.

As described above, the document prepared by the processes described with the flowcharts of FIG. 5 and FIGS. 6A and 6B is stored in the MEM 14 so that the data of the structures as shown in FIG. 13, together with the text information, can be identified by a document name as a document, and thus becomes available for a subsequent process. For example, it is possible to print out the document by the image output means 34, to send it through the modem 38 to another facsimile device or computer, or to store it in a detachable storage medium such as the FD 18 and reproduce it by calling it when necessary.

Figure 14:
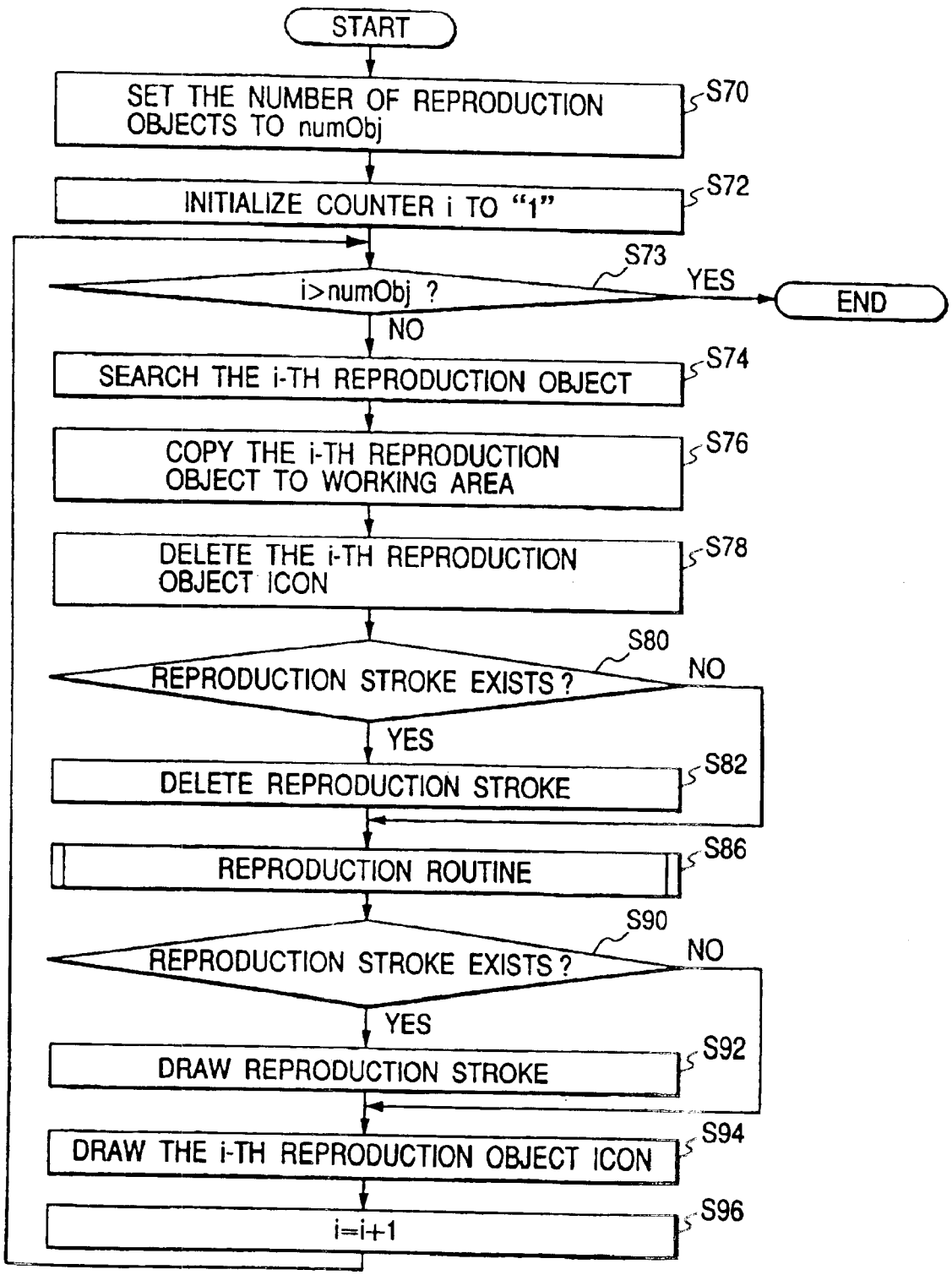
FIG. 14 is a flowchart of a reproduction process of object.
Figures 15, 15A:
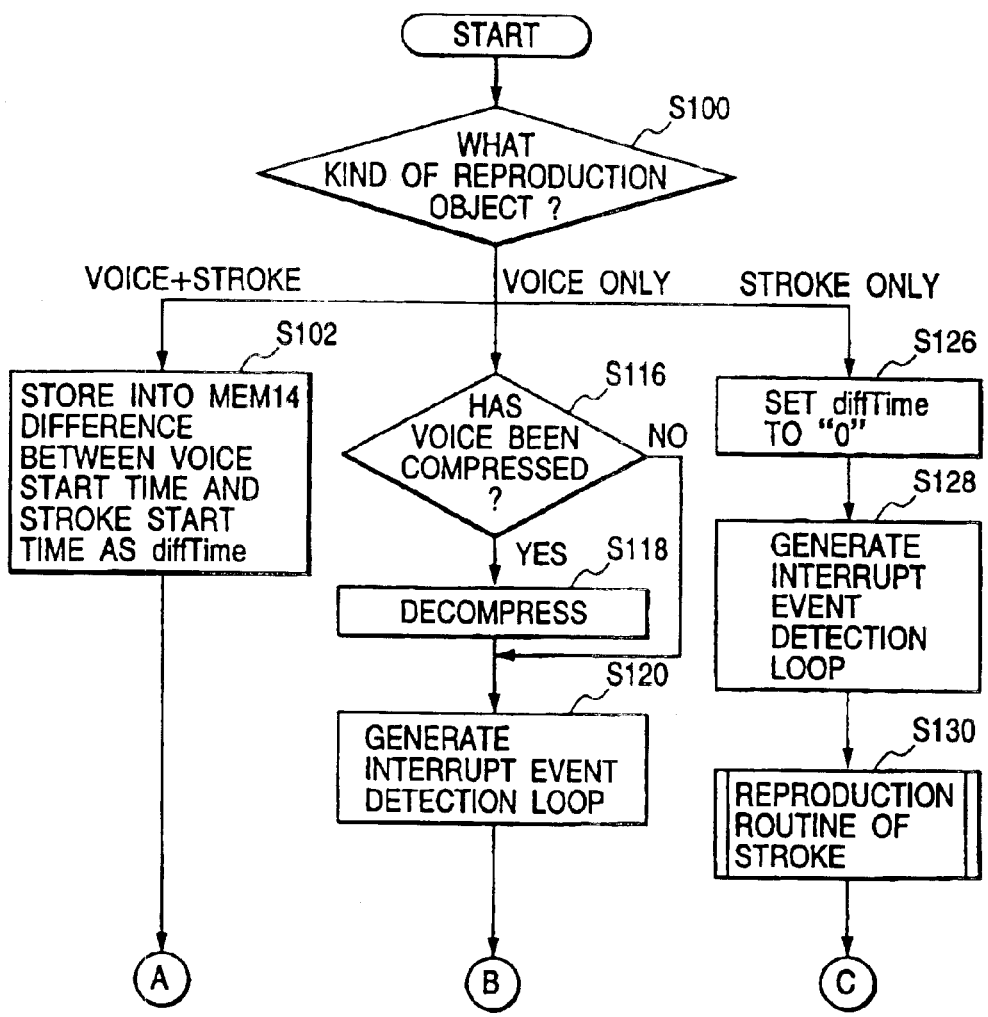
FIG. 15 which is comprised of FIGS. 15A and 15B is a flowchart of a reproduction routine.
Figures 16, 16A:
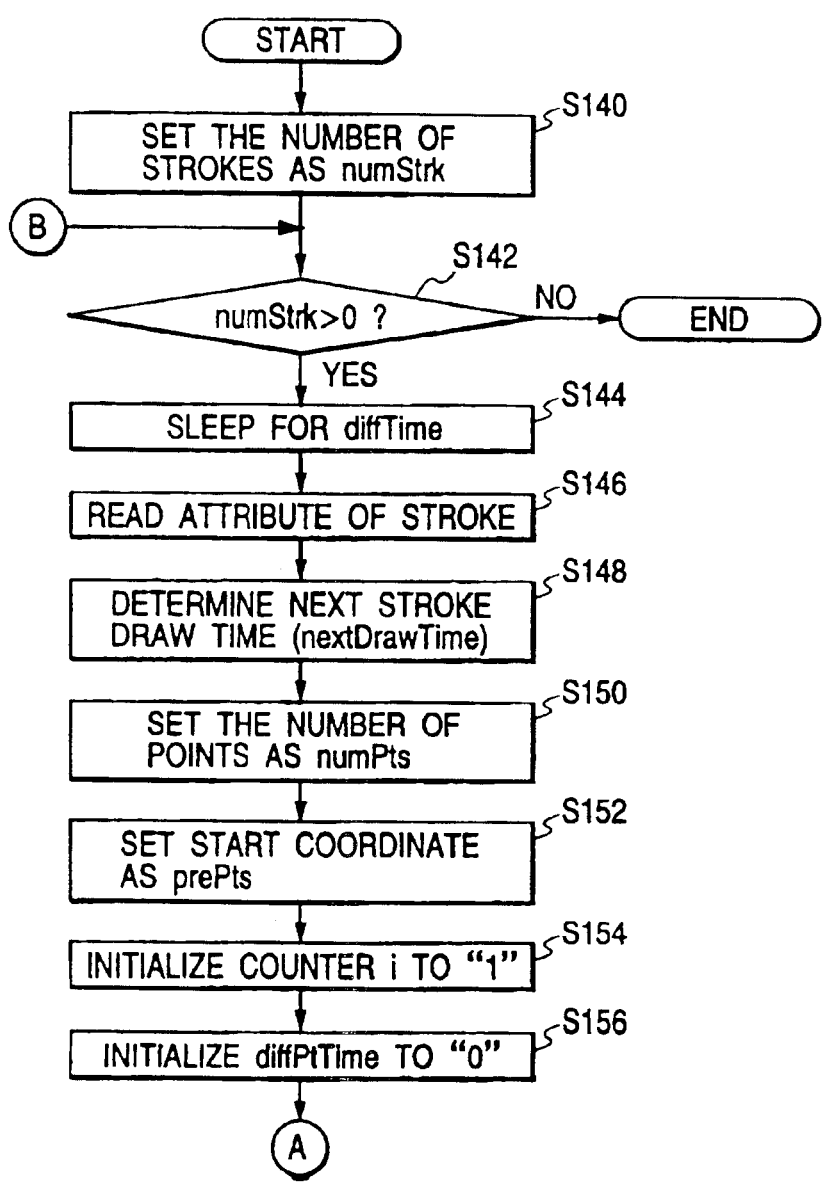
FIG. 16 which is comprised of FIGS. 16A and 16B is a flowchart of a stroke reproduction process.

Next described referring to the flowcharts of FIGS. 14 to 16 are processes for reproducing the document after storage or transmission as described above, or for reproducing the document in the middle of preparation of document.

Reproduction of the dynamic stroke and voice is started by either of two ways: (1) clicking the reproduction start button 818; (2) double-clicking an icon of an object desired to reproduce. In the reproduction method of (1), objects to be reproduced are switched to those in either one of the following two cases according to a selected state of objects at the time of the click on the reproduction start button 818.

(1-1) When the reproduction start button 818 is clicked in a state without the select operation, the objects in the document are the objects to be reproduced and are reproduced in the order of entry of the objects. (1-2) When some of the objects are clicked into the selected state, the objects are reproduced in the order of select operations thereof.

The flowchart of FIG. 14 will be described herein with the example of the process (1-1) where reproduction of objects is designated in the state without the select operation.

First, the objects as reproduction objects in the document are counted from the data in the MEM 14 and the number of objects is stored as numObj in the MEM 14 (S70). The counter i in the MEM 14 is initialized to 1 (S72), it is determined whether i is larger than numObj (S73), and the processor goes to S74 with no. The determination of S73 is repetitively carried out until i is determined to be larger than numObj, i.e., until it is determined that the following processes of S74 to S96 are carried out for the all objects determined as the objects in S70.

Since in this example the processes of S74 to S96 are repeated in the order of entry of the objects, the reproduction objects are retrieved in the order of entry of the objects (S74). This order of entry of the objects can be determined by checking St (input start time) in the header part of cluster data stored in the MEM 14 and retrieving the data in order from the earliest.

The data of the i-th reproduction object is copied onto the working area in the MEM 14 (S76) and the icon of the i-th reproduction object is erased from the display screen (S78). It is determined if the i-th object includes a reproduction stroke (S80). If there is the reproduction stroke then the stroke is erased from the display screen (S82). Image data (for example, another stroke, text, image, or the like) located below the stroke is drawn in pixels where the reproduction stroke was erased.

Figure 17:
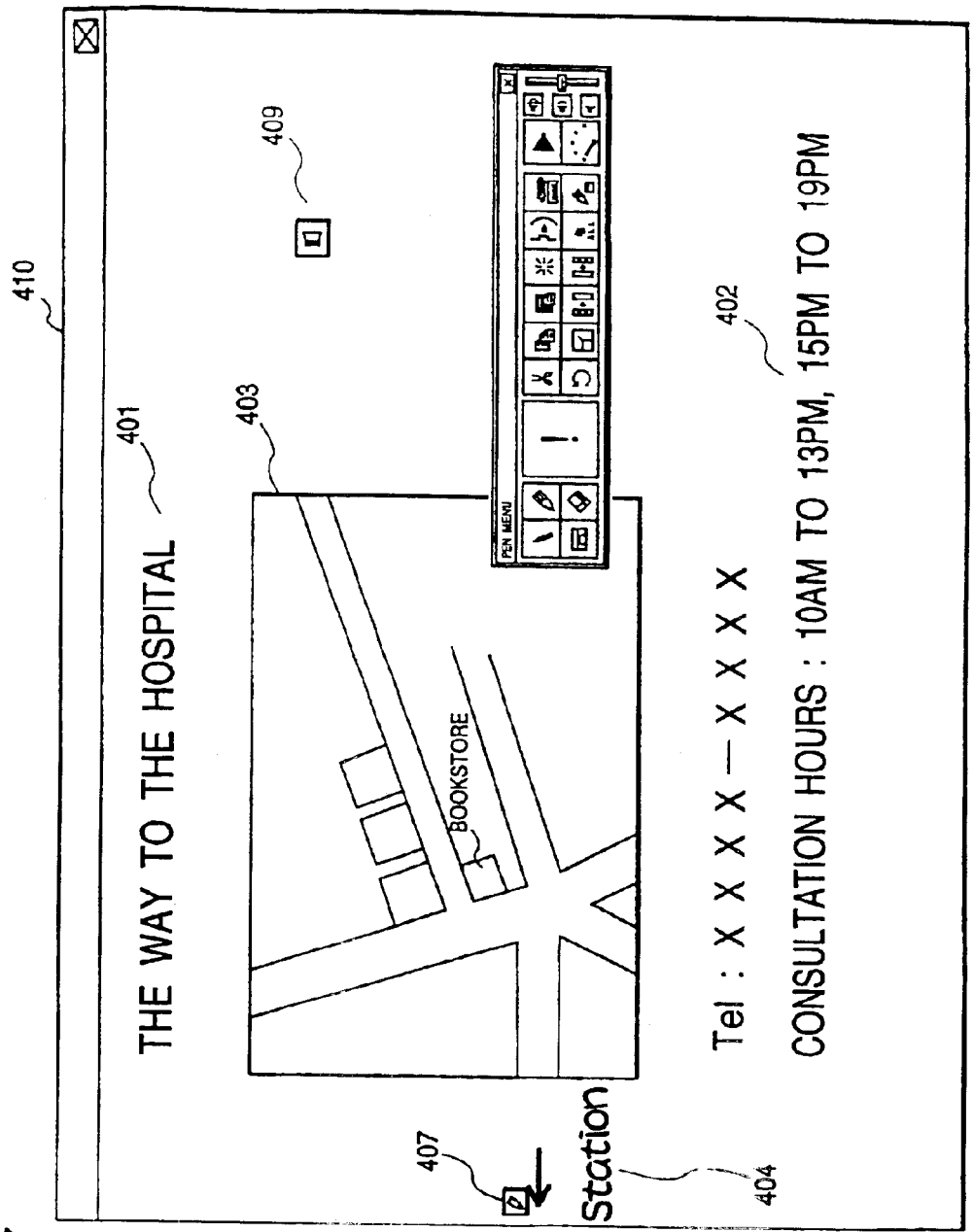
FIG. 17 is a diagram to explain the screen in the middle of reproduction of the document of FIG. 4.

FIG. 17 shows the display screen after the process of S82 in the state where the reproduction start button 818 was clicked with displaying the document exemplified in FIG. 4 to designate the first drawn object (the strokes 405 and 406 and voice data) as a reproduction object. The icon 408 and the strokes 405, 406 of the first object are erased from the screen.

Then the processor carries out the reproduction routine of data of the i-th object (S86). This process of the reproduction routine will be described hereinafter referring to the flowchart of FIGS. 15A and 15B. When it is determined in S80 that the i-th object includes no reproduction stroke, only the voice is reproduced in S86 without executing the stroke erase process of S82.

If there is a reproduction stroke (S90) the reproduction stroke is drawn on the display screen (S92). Since the reproduction process of S86 is temporary reproduction of image, the drawing of stroke is carried out again to draw the image of the stroke.

The icon of the i-th reproduction object is drawn (S94), i is incremented by one (S96), and the processor returns to S73 and repetitively carries out reproduction of the all objects set in S70.

In the case of above (1-2) described previously as a case to carry out reproduction of objects, the number of objects in the selected state as reproduction objects is set in numObj in S70, and the objects are retrieved in the order of the select operations in S74. In the case of above (2), 1 is set in numObj as the number of reproduction objects in S70.

Figure 15B:
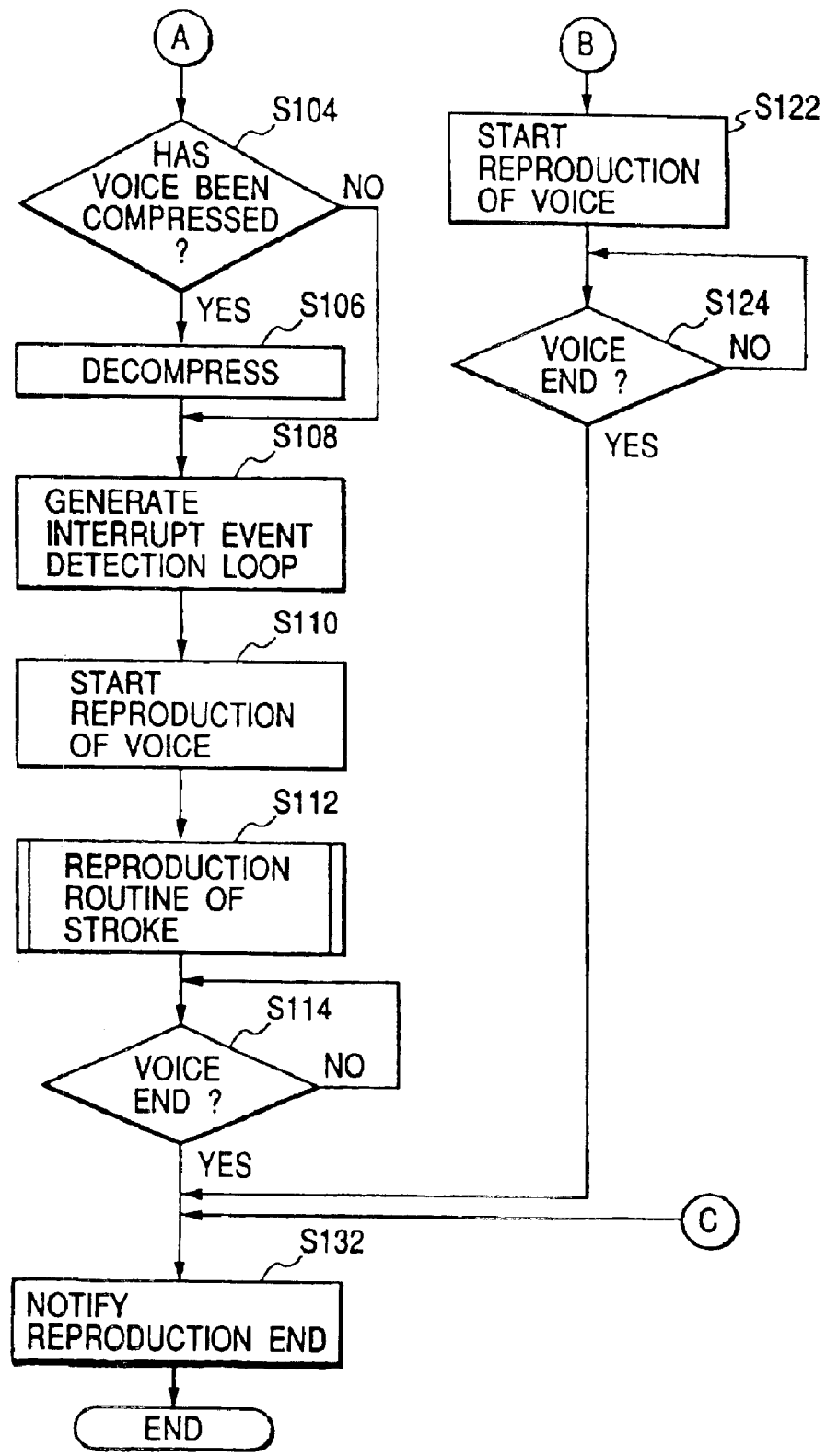

The reproduction routine of S86 will be described referring to the flowchart of FIGS. 15A and 15B. The kind of the reproduction object is determined (S100), and the process is branched according to the both voice data and stroke data, only the voice data, or only the stroke data. This type of the object can be determined by analyzing the object data copied on the working area in S76 and referencing the Dk (kind) data of the header part in this data.

When the data of the reproduction object includes the both voice data and stroke data, the processor calculates a difference between the voice start time (St in the header part of the voice data in the object data) and the stroke start time (the earliest of the header part St of the reproduction stroke data included in the object data) and stores the difference as diffTime in the MEM 14 (S102).

When it is determined that the voice data is compressed (S104), the processor decompresses the data (S106), creates an interrupt event detection loop (S108), and starts reproduction of voice (S110).

The interrupt event is, for example, a click on the reproduction end button, changeover of input mode, or the like.

The reproduction routine (S112) of the stroke will be described hereinafter with the flowchart of FIGS. 16A and 16B.

When the reproduction of voice is determined to end (S114), the operator is notified of the end of the reproduction process, for example, by outputting such a predetermined sound as "zhang ♪" (S132). Here, the determination of the end of the reproduction process of voice is made based on determination that the reproduction is completed up to the tail of the data stored in the voice file.

When it is determined in S100 that the kind of the reproduction object is only the voice data, the processor proceeds to S116 to determine whether the voice data is compressed (S116). When the voice data is compressed, the processor decompresses the data (S118), creates an interrupt event detection loop (S120), and starts reproduction of voice (S122). When the reproduction of voice is determined to end (S124), the operator is notified of the completion of the reproduction process (S132).

When it is determined in S100 that the kind of the reproduction object is only the stroke data, the processor goes to S126 to store 0 as diffTime in the MEM 14, creates an interrupt event detection loop (S128), and reproduce the stroke (S130). The reproduction routine of stroke will be described hereinafter referring to the flowchart of FIGS. 16A and 16B, as well as S112. When the reproduction of stroke is completed, the operator is notified of the end of the reproduction process (S132).

Figure 16B:
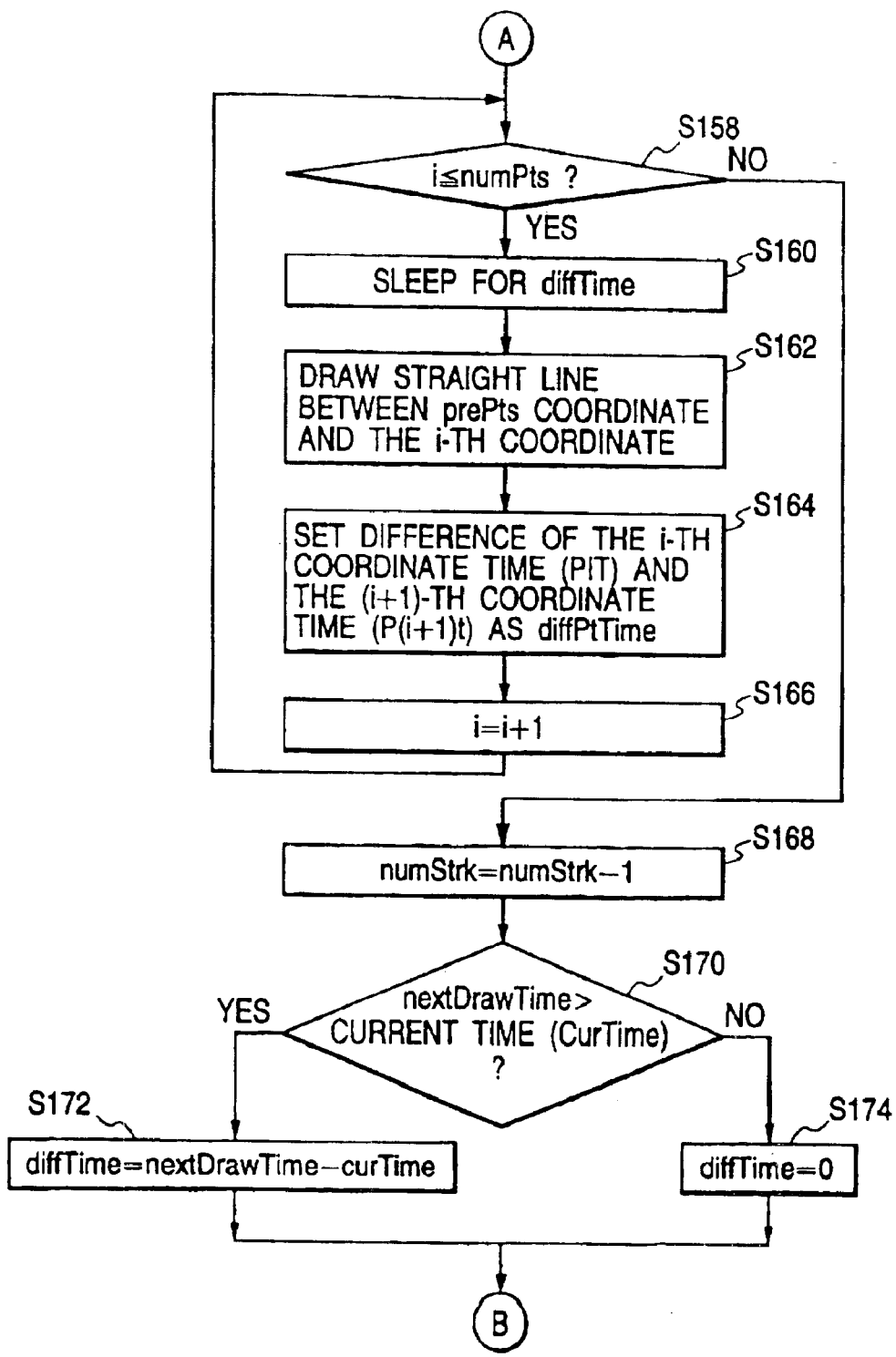

The reproduction process of stroke is carried out as illustrated in the flowchart of FIGS. 16A and 16B.

First, the number of strokes in the i-th reproduction object is checked by analyzing the data in the body part of the data copied in S76 to count the stroke data pieces, and this value is stored as numStrk in the MEM 14 (S140).

It is determined whether numStrk is greater than 0 (S142) and the processor goes to S144 in the case of affirmative determination. The determination of S142 is repetitively carried out until numStrk is determined to be not more than 0, i.e., until it is determined that the following processes of S144 to S166 to reproduce a stroke are completed for the all strokes counted in S140.

In S144 the processor is kept in a sleep state for the time set in diffTime. If the stroke as a currently processed object is the first stroke, diffTime in S112 is the difference between the voice start time and the stroke start time, stored in S102, whereas diffTime in S130 is 0 set in S126.

The strokes to be processed in S144 to S166 are the stroke data counted in S140, and they are selected as an object of the processes in S144 to S166 in order from the earliest stroke, based on comparison of St (input start time) in the header part of each stroke data. The stroke data as a processed object will be called hereinafter current stroke data.

The processor reads the attributes of the current stroke data (S146), determines a draw time of next stroke data nextDrawTime, and stores it in the MEM 14 (S148). This nextDrawTime is obtained by adding the difference between St of the current stroke data and St of the next stroke data to the present time (the present time in the clock function in the apparatus).

The processor reads the number of points of the current stroke data from the MEM 14 and stores it as numPts in the MEM 14 (S150). This number of points is given by the value of n in the body part of the stroke data.

Then the processor reads the start coordinate point (P1) from the MEM 14 and stores it as prePts in the MEM 14 (S152). Then the processor initializes the counter i in the MEM 14 to 1 (S154) and also initializes diffPtTime to 0 (S156).

It is determined whether i is not more than numPts (S158) and the processor goes to S160 in the case of affirmative determination. The determination of S158 is repetitively carried out until it is determined that i is larger than numPts, that is, until the reproduction operation of S160 to S166 is completed for the all coordinate points of the current stroke.

Then the processor is kept in a sleep state for the time set as diffPtTime (S160), draws a straight line connecting the coordinates stored as prePts with the coordinates of the i-th point (S162), updates the data in the MEM 14 to set the difference between the i-th coordinate time (Pit) and the (i+1)th coordinate time (P(i+1)t) as a value of diffPtTime (S164), increments i by one (S166), and returns to S158.

When the determination is negative in S158, the processor goes to S168 to decrement numStrk by one and then compares nextDrawTime with the current time in S170. When it is determined in S170 that nextDrawTime is larger than the current time (curTime), the processor updates the value of diffTime in the MEM 14 to the value obtained by nextDrawTime-curTime (the difference between nextDrawTime determined in S148 and the current time) (S172). When it is determined in S170 that nextDrawTime is not greater than the current time, the processor updates diffTime in the MEM 14 to 0 (S174).

By repetitively carrying out the operation of S160 to S166, one stroke is reproduced at the same speed, in the same shape, and at the same position as those upon entry. By repetitively carrying out the operation of S144 to S174, the all strokes in one object are reproduced at the same speed and at the same time intervals as those upon entry thereof.

If the attributes read in S146 are drawn upon drawing of the stroke in S162, it becomes possible to make the user recognize reproduction of the stroke even without erasure of the stroke in S82.

Next described is the data in which a plurality of strokes drawn in the draw mode are grouped and handled as one object, as described previously, and which is stored as cluster data in the MEM 14.

Figure 18:
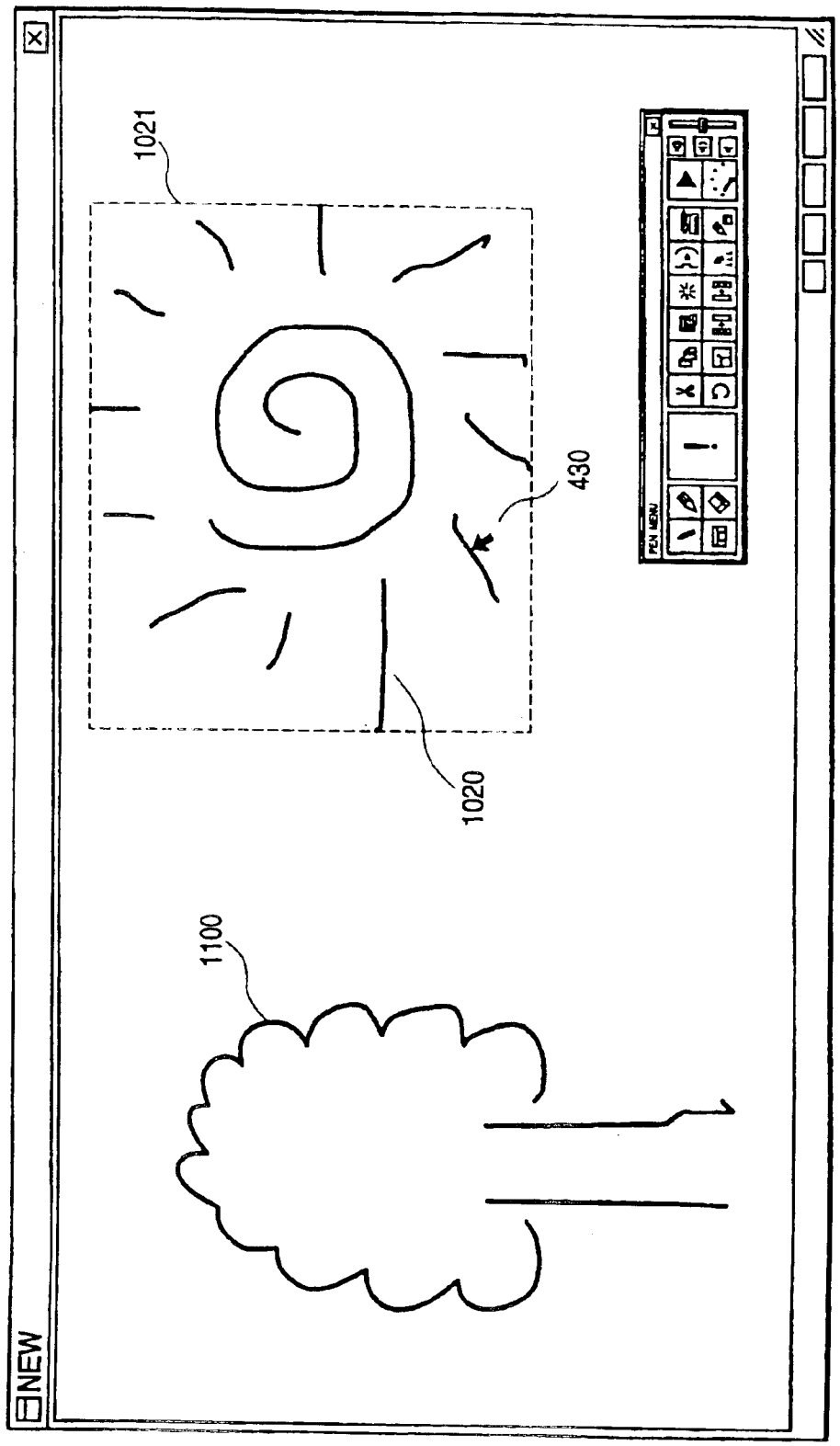
FIG. 18 is a diagram to explain the screen in an object-selected state.

FIG. 18 illustrates an example in which two objects are drawn in the draw mode. In this document there are an object 1100 composed of two strokes to indicate a tree, and an object 1020 composed of thirteen strokes to indicate the sun.

When in the edit mode the vicinity of a stroke is clicked by cursor, the whole object including that stroke is selected and a circumscribed rectangle around the selected object is displayed based on the data of Ox, Oy, Cx, Cy in the header part of the selected object. This display of the circumscribed rectangle informs the operator that the object is selected and which strokes belong to the object. FIG. 18 shows a state in which the cursor 430 is located near one stroke of the object 1020 and clicked there whereby the object 1020 including that stroke is selected and the circumscribed rectangle 1021 around that object is displayed.

The processes carried out in S20, including the edit process, movement, cut, copy, paste, clear, smooth, engross, rotate, resize, etc., are effected on the whole of this selected object.

Figure 19:
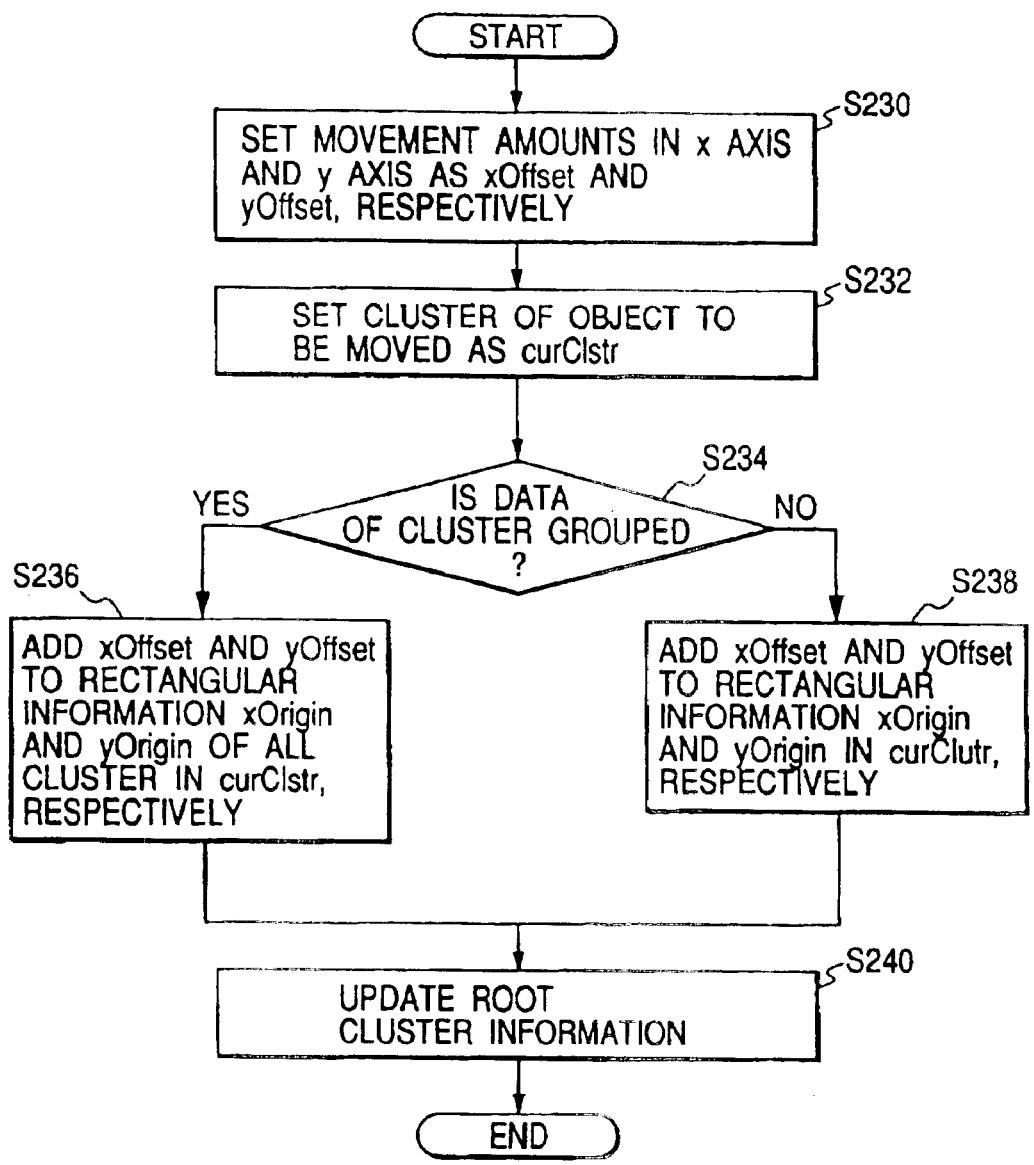
FIG. 19 is a flowchart of a movement process of object.

Now, let us explain the process for moving the selected object by an example to carry out the movement process for moving the object 1100 of the tree toward the object 1020 of the sun according to the flowchart of FIG. 19.

Figure 20:
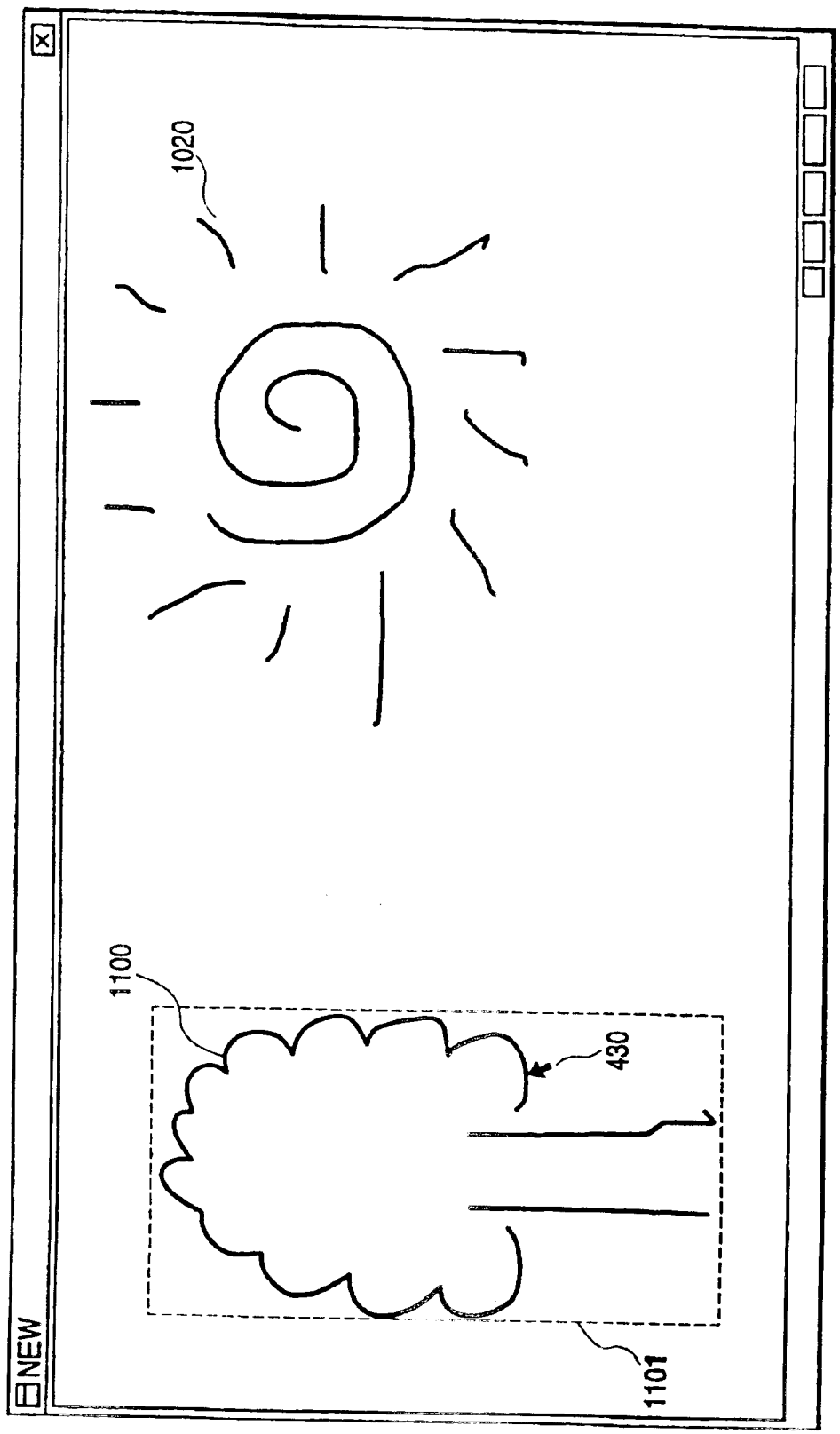
FIG. 20 is a drawing to show an example of the screen in a state in which an object to be moved is designated.

FIG. 20 illustrates the display screen where the object 1100 is selected by the cursor 430 and a circumscribed rectangle 1101 is displayed. When the cursor 430 is dragged in this state, amounts of movement of the cursor in the x-axis direction and in the y-axis direction are stored as xOffset and yOffset in the MEM 14 (S230). The cluster of the object to be moved (the cluster of the object 1100 in FIG. 20) is stored as curClstr in the MEM 14 (S232). It is determined whether the data of curClstr is grouped data or not (S234). When it is determined to be grouped data, the processor adds xOffset or yOffset to rectangular information xOrigin or yOrigin, respectively, of all clusters in curClstr (S236). This means that when plural strokes are grouped as an object like the object 1100, xOffset or yOffset is added to the rectangular information of the all strokes, xOrigin or yOrigin, respectively.

If it is determined in S234 that the data of curClstr is not grouped data, xOffset or yOffset is added to the rectangular information of curClstr, xOrigin or yOrigin, respectively (S238). After completion of the process of S236 or S238 to add xOffset and yOffset, the information of the root cluster is updated (S240). When the continuous press on the button of the mouse 20 is freed to end the drag, the processor determines the end of the movement instruction and replaces the data stored in the MEM 14 with the data updated in S236 to S240 as the data after movement, whereby the strokes are displayed as moved.

Figure 21:
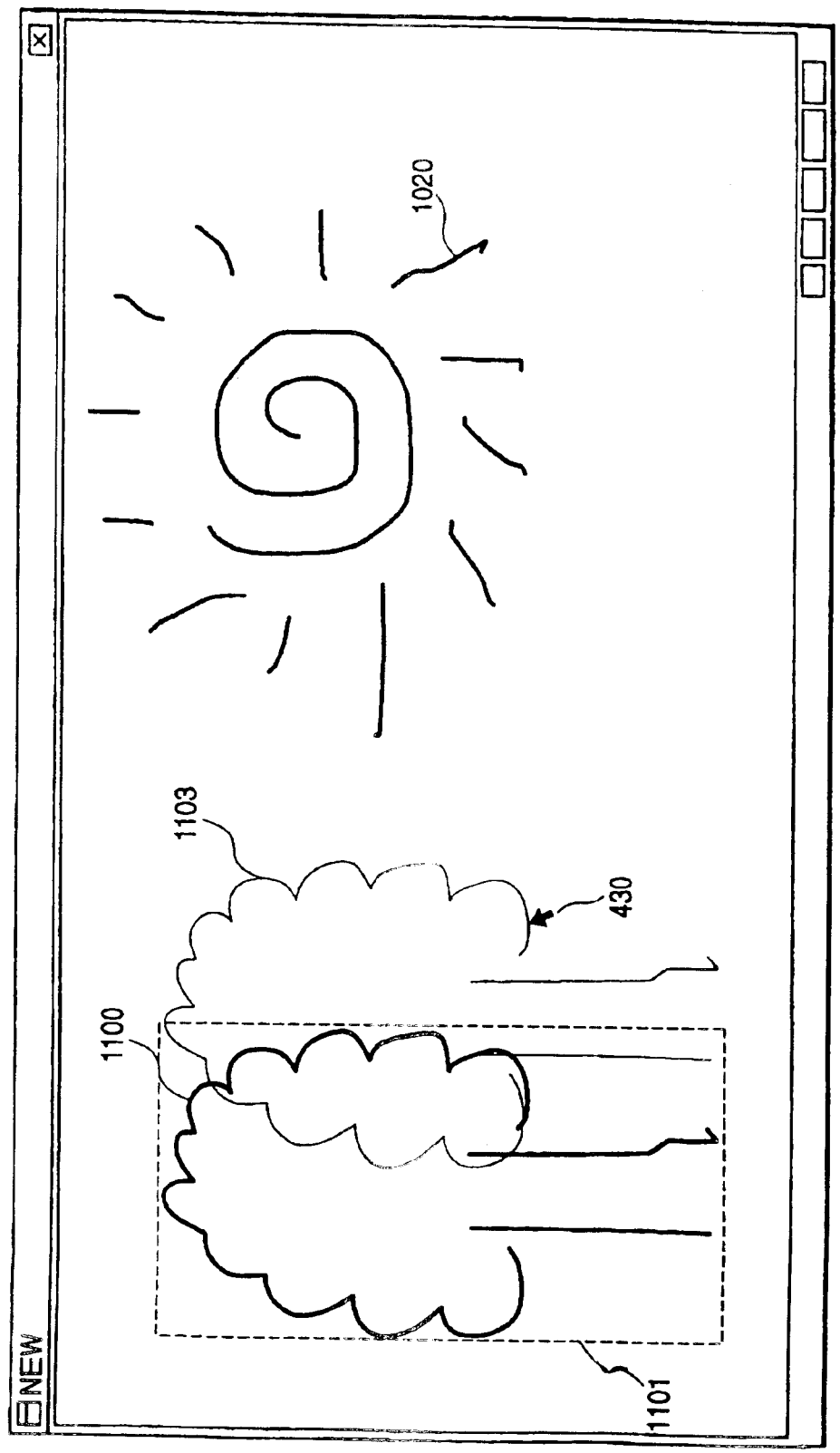
FIG. 21 is a drawing to show an example of the screen in the middle of movement of the object.
Figure 22:
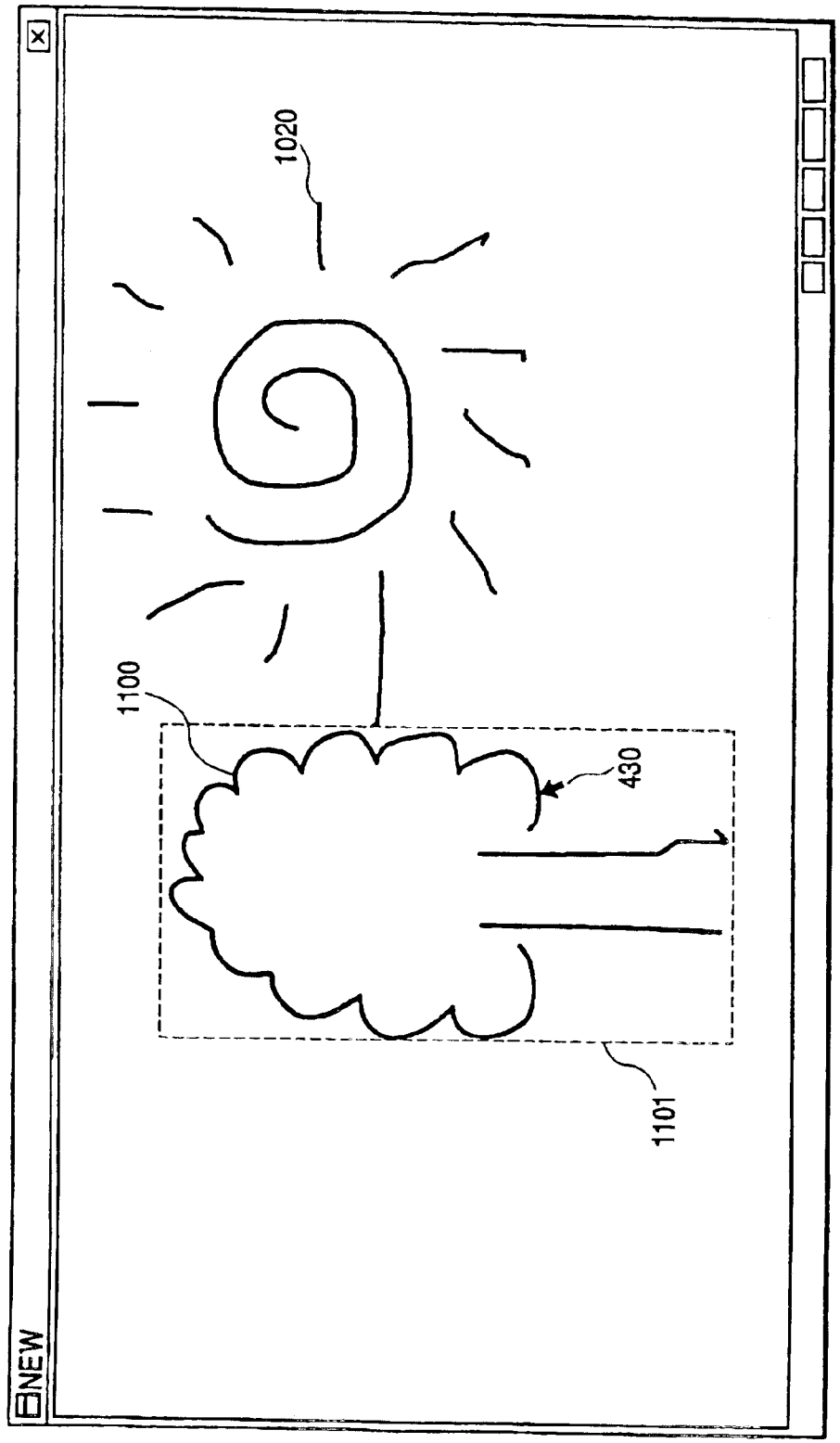
FIG. 22 is a diagram to show an example of the screen at the end of movement of the object.

FIG. 22 is a diagram after completion of the movement process, in which the display of the object 1100 is updated to the position designated by the cursor. In the middle of the movement, as shown in FIG. 21, the object 1100 is displayed as held at the position upon the selection before the instruction of the movement and a stroke 1103 is displayed as moving following the cursor. This stroke 1103 is a temporary display during the movement, which is indicated based on the data in curClstr. However, this display does not reflect the attributes of the stroke and is given by a simple line (for example, the color of the line is black and the thickness of the line is finest), for easy change of display.

Figure 23:
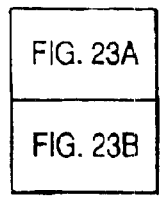
FIG. 23 which is comprised of FIGS. 23A and 23B is a flowchart of an eraser process.
Figure 23A:
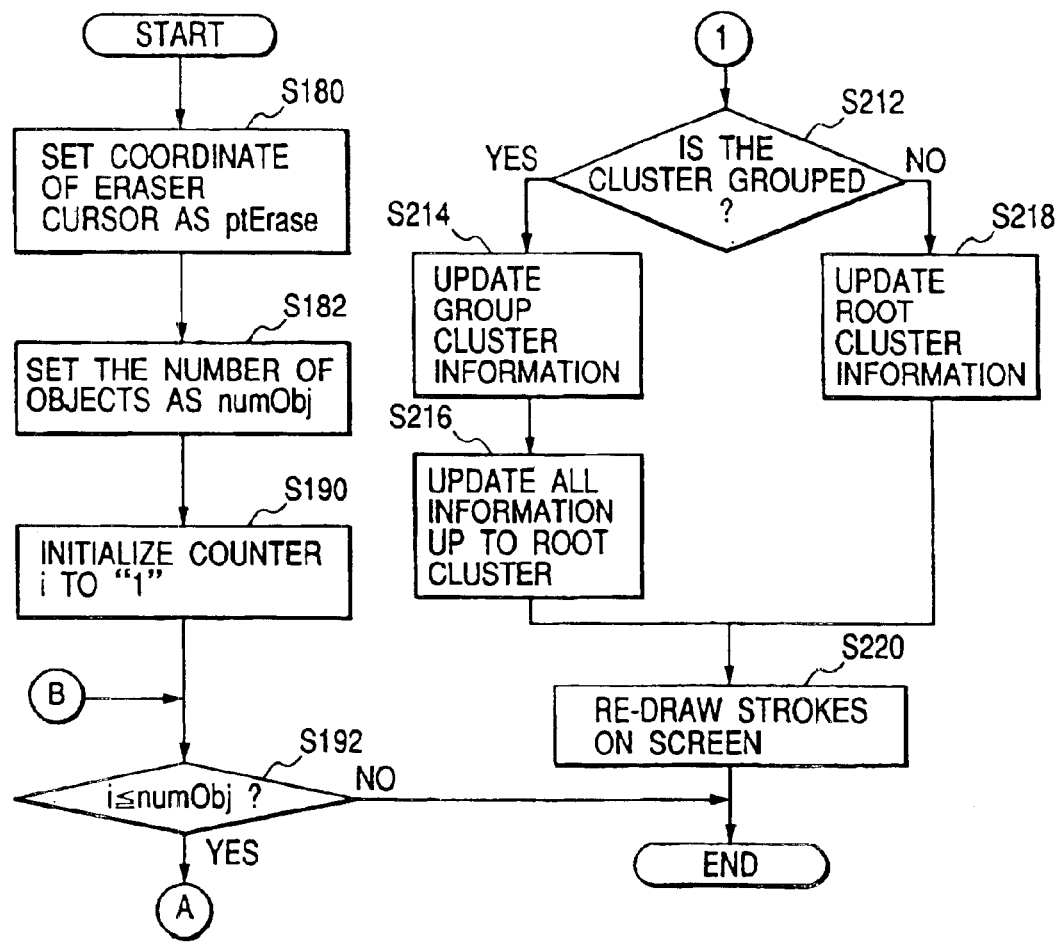
Figure 23B:
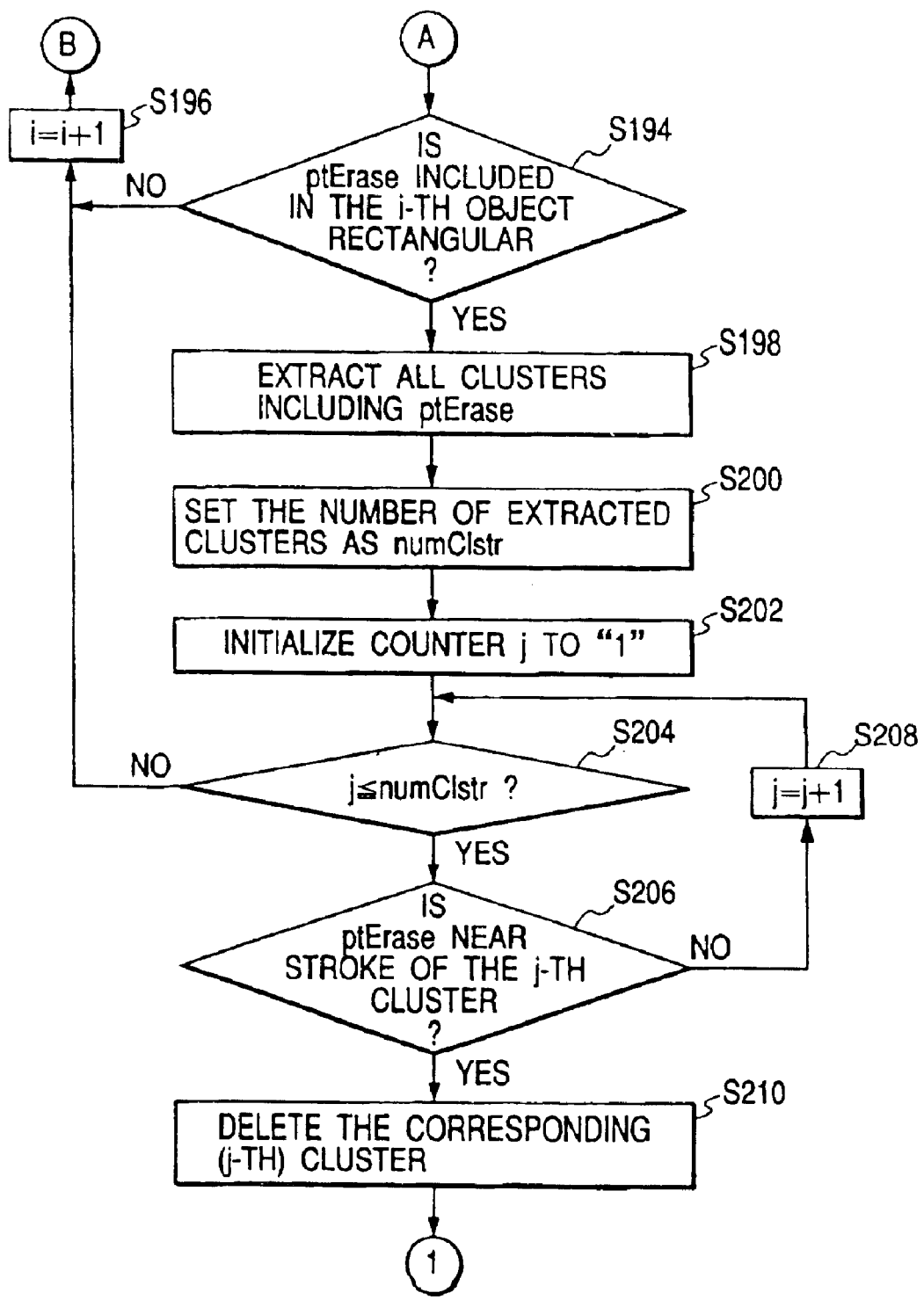

Let us next explain the eraser process in S22 according to the flowchart of FIGS. 23A and 23B.

Figure 24:
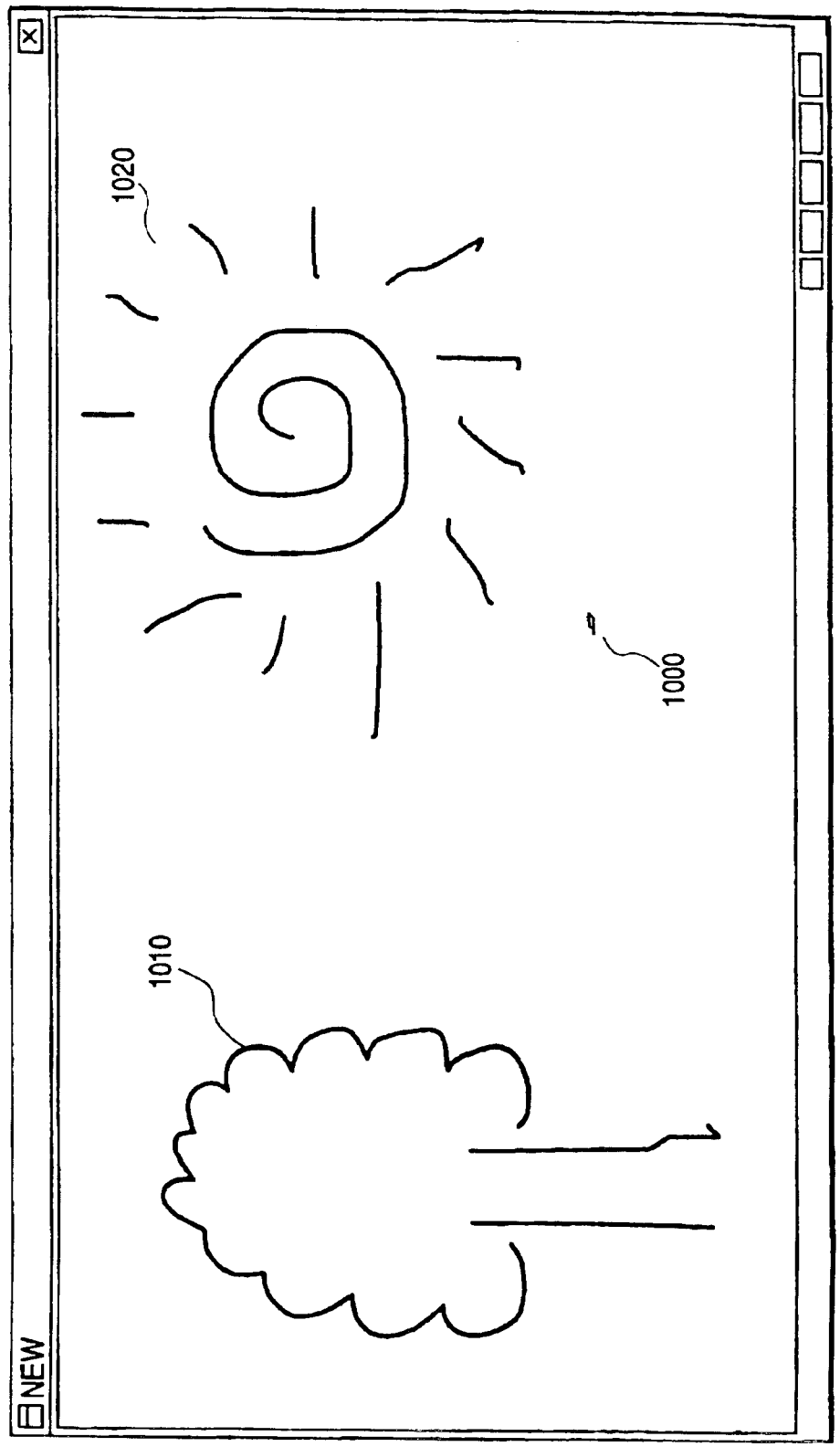
FIG. 24 is a diagram to show an example of the screen in an eraser mode.

When the eraser mode button 803 is clicked, the mode is switched to the eraser mode and the mouse cursor is switched to an image of an eraser (an eraser cursor 1000 in an example of the screen in FIG. 24). In response to, a press on the button of mouse 20 or a detection of pen down by the digitizer 24, the eraser cursor is displayed at that position and coordinate values thereof are stored as ptErase in the MEM 14 (S180). The number of objects in the document is read from the data stored in the MEM 14 and is stored as numObj in the MEM 14 (S182). Then the counter i is initialized to 1 (S190). It is then determined whether i is not more than numObj (S192) and the processor goes to S194 in the case of affirmative determination. This determination of S192 about whether i is not more than numObj is repetitively carried out until i is determined to be more than numObj, that is, until it is determined that the determination step of whether the position of the eraser cursor is included in an object (S194) has been carried out for the all objects counted in S182.

In S194 it is determined whether the eraser cursor is included in a rectangle of the i-th object, by comparing ptErase with the information to indicate the circumscribed rectangle in the header part of the i-th object to determine whether ptErase is included in the circumscribed rectangle. When the eraser cursor is determined to be included, ptErase is subsequently compared with the information to indicate the circumscribed rectangle in the header part of each cluster of the i-th object to extract all clusters including ptErase (S198). Then the processor counts the number of cluster data extracted to store the number as numClstr in the MEM 14 (S200) and initializes the counter j to 1 (S202). Then the processor determines whether j is not more than numClstr (S204) and goes to S206 in the case of affirmative determination. In the case of negative determination, the determination means that the determination of whether the eraser cursor is located near the stroke indicated by the cluster (S206) is completed for the all clusters extracted in S198, and thus the processor goes to S196 to increment i by one and then moves to comparison with another object.

In S206 it is determined whether ptErase is a point near the stroke in the j-th cluster. This determination is carried out as follows; the processor compares distances of straight lines connecting between ptErase and each coordinate point in the j-th cluster with a predetermined threshold and determines that ptErase is a point close to the stroke in the j-th cluster if it is closer than the threshold of the predetermined distance value preliminarily stored in the MEM 14. If the determination in S206 is negative, the processor increments j by one in S208 and goes to comparison with the next cluster. If the point is determined to be a point near the stroke in S206, the processor goes to S210 to delete the pertinent cluster (the j-th cluster) from the MEM 14 and from the area on the display screen.

Figure 25:
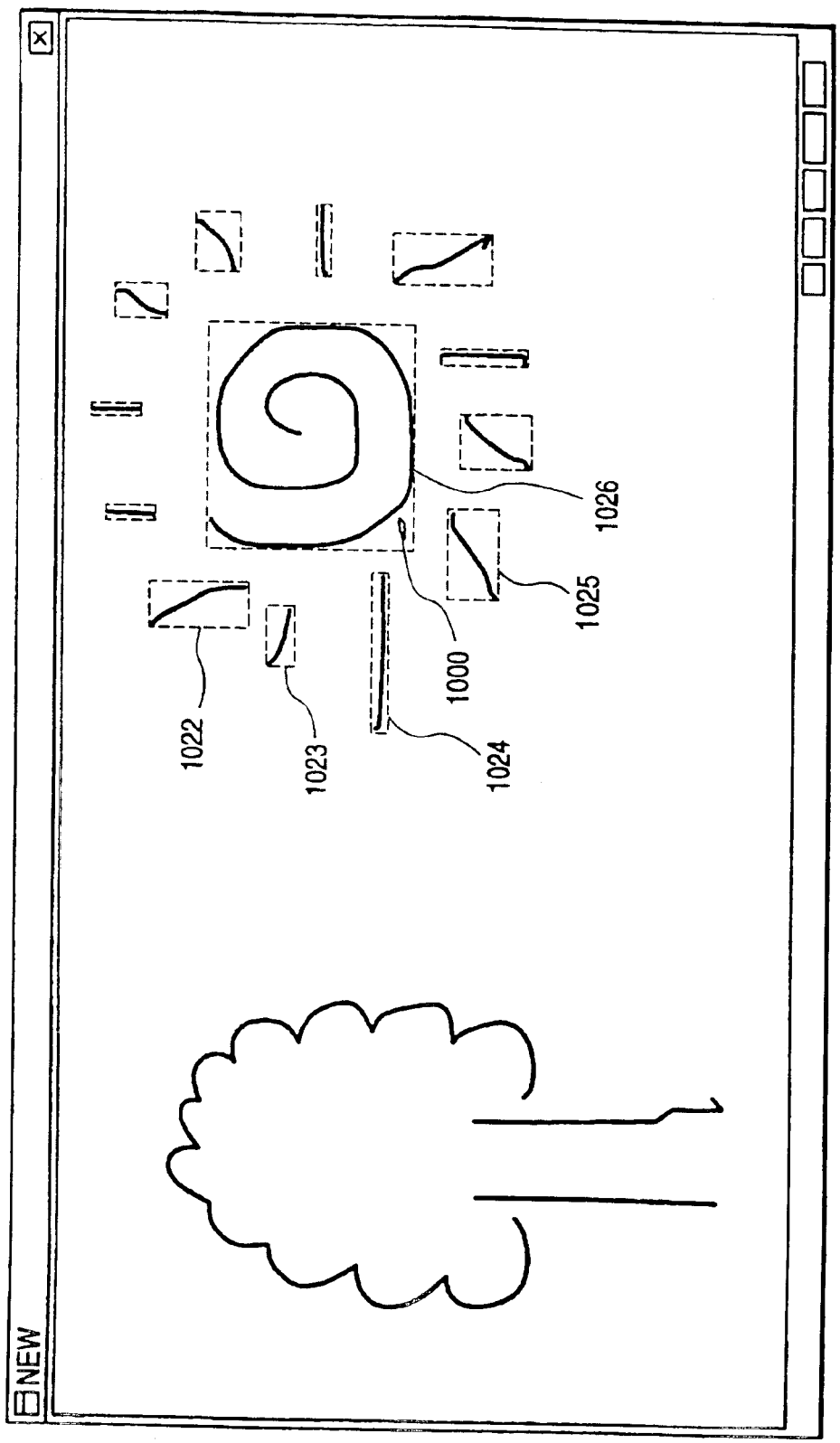
FIG. 25 is a diagram to explain circumscribed rectangles around respective strokes as grouped.
Figure 26:
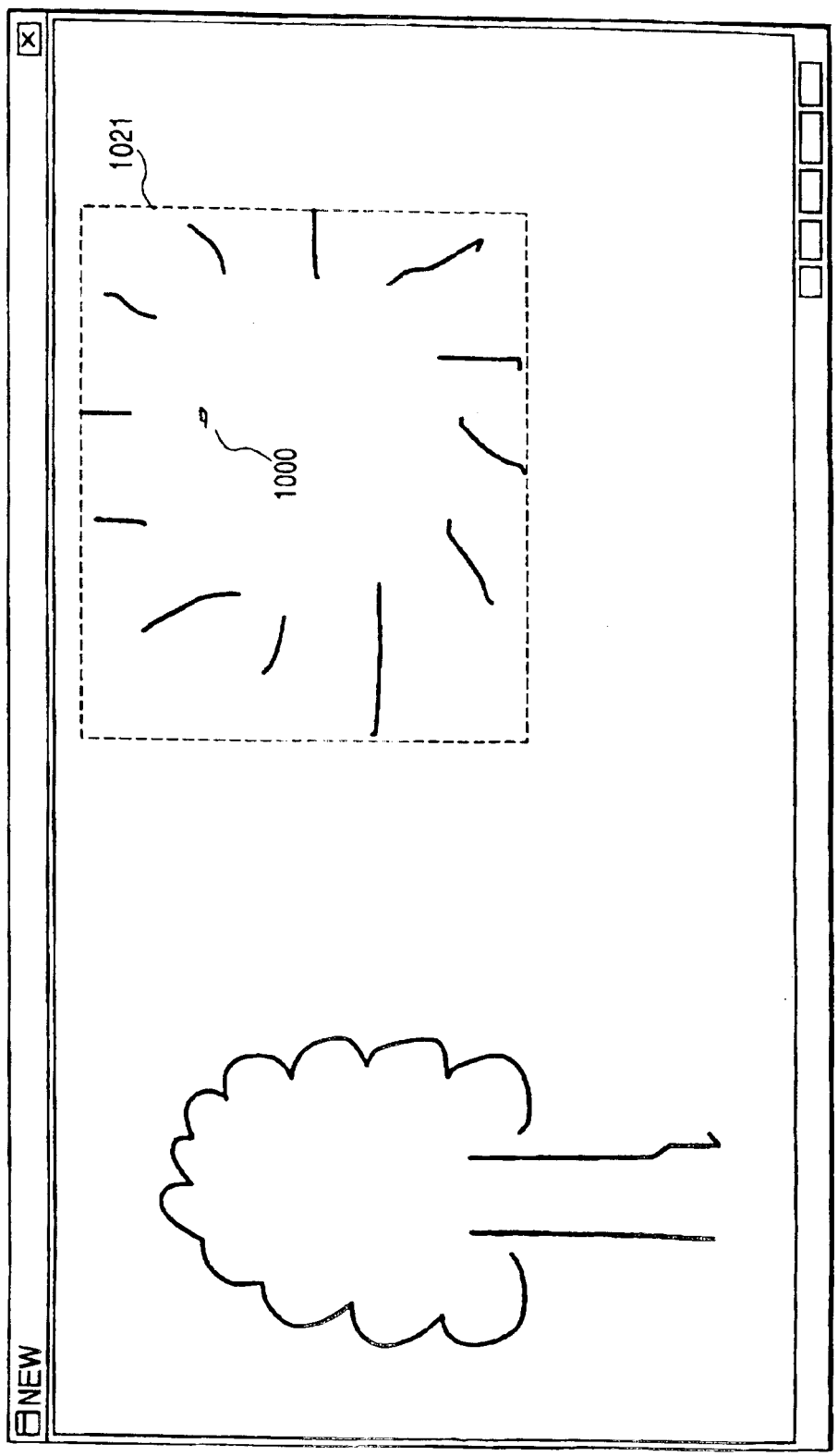
FIG. 26 is a diagram to show an example of the screen where a stroke is erased by an eraser.

FIG. 25 illustrates an example in which the thirteen strokes are grouped as an object, as previously described in FIG. 18, and each stroke is handled as separate cluster data independent from the others. Dotted lines represent circumscribed rectangles of the respective clusters. Supposing the eraser cursor 1000 is located near the stroke 1026, it is determined in S206 that the position of the eraser cursor 1000 is a point near the stroke 1026 and the stroke 1026 is erased in S210. The screen in which the stroke 1026 is erased is illustrated in FIG. 26. After one cluster data forming the object is erased, the object 1021 is composed of the twelve remaining strokes. Although in FIG. 25 and FIG. 26 there are illustrated the frames of the dotted lines to explain the respective clusters, the frames of the dotted lines are not actually displayed in the eraser mode.

The example stated herein was the example in which the object to be processed was a single stroke only in the eraser mode, but it should be noted that this is not limited to the eraser mode and that in another edit function the extraction and process execution of only a single stroke can also be performed by carrying out the operation of S204 to S220 during execution of the function with the processed object being the single stroke. In this case, it is preliminarily determined for each of the kinds of the edit modes that the object to be processed should be either a single stroke or the all strokes belonging to one group, the determination is stored in the form of a table in the memory 14, and the object to be processed is switched between the two modes according to determination about which object mode is set in the edit mode designated.

The above described the entry and edit of stroke in the processing of document, but these processes can also be utilized as document processing functions in electronic mail and the like.

Figure 27:
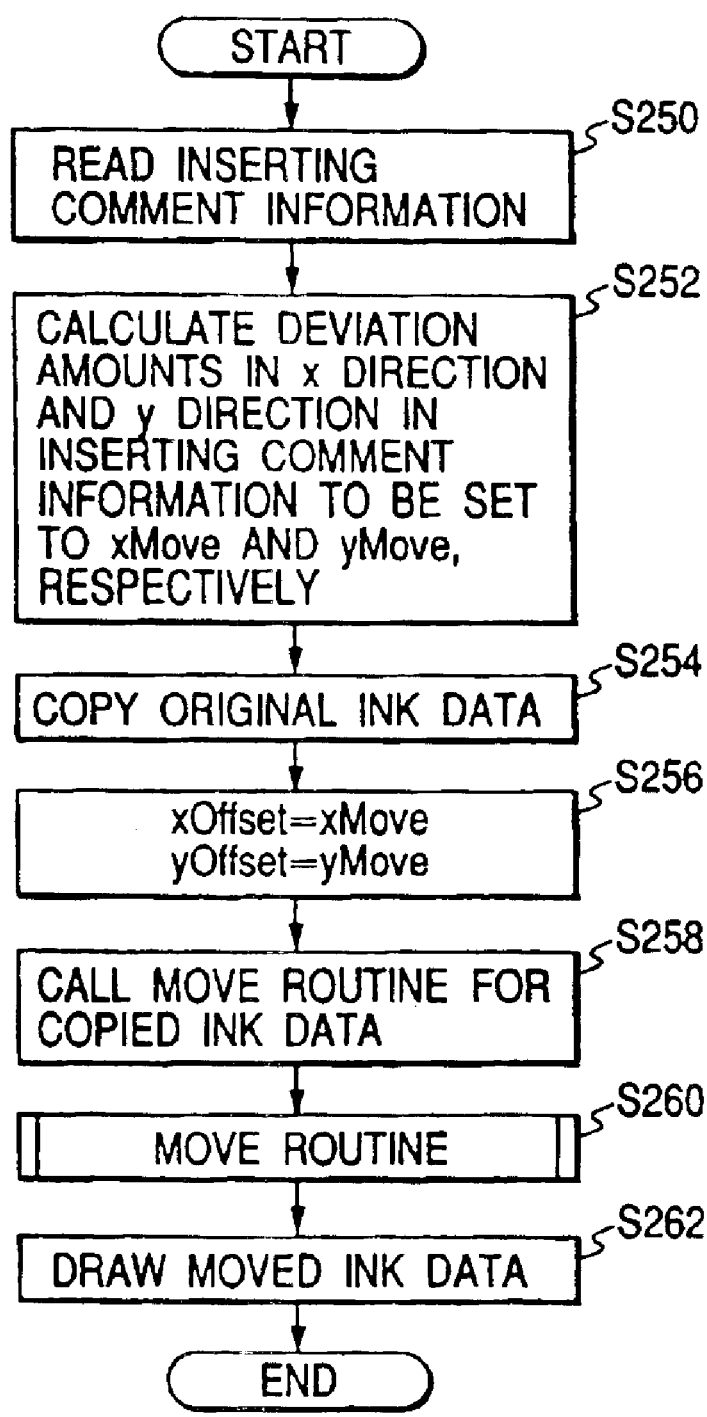
FIG. 27 is a flowchart of a quotation process.

In the electronic mail, the processes carried out during preparation of document by the sender are the same as the above processes, and the following describes, referring to the flowchart of FIG. 27, a process for quoting a received mail when the receiver of the electronic mail including the stroke and voice data sends a reply mail.

The processor reads information of an inserting comment from a quotation format memory area of the MEM 14 (S250), calculates deviation amounts in the x-direction and in the y-direction in the inserting comment information, and stores them as xMove and yMove in the MEM 14 (S252). The x-directional deviation amount is determined as follows; the processor reads an inserting comment text to the head of the document set in the quotation format, calculates an x-directional length necessary for the inserting comment from the number of lines and the format (the line pitch, character size, etc.) for output of the inserting comment, and defines the value as the x-directional deviation amount. The y-directional deviation amount is determined by calculating a y-directional length necessary for a quotation symbol from the number of characters in the quotation symbol at the beginning of line in the quotation format and the format for output of the quotation symbol (character pitch, character size, etc.) and defining that value as the y-directional deviation amount. The quotation symbol is a character string that is repetitively inserted at the beginning of each line in a quoted text, and the inserting comment text is a character string that is inserted at the head of the quoted text. The contents, character numbers, and line numbers of the inserting comment text and quotation symbol can be arbitrarily set by the user. By storing the set information in the memory 14, adequate deviation amounts can be calculated upon the quotation process.

The processor reads the original ink data comprised of the stroke data and voice data of the quoted mail from the memory area of MEM 14 storing the received data, and copies it onto the working area in the MEM 14 to store it (S254). Here, the term "ink data" means a stroke data and a data by which the stroke data is accompanied. Then the processor sets the value of xMove, stored in the MEM 14, as a value of xOffset and the value of yMove as a value of yOffset and stores them in the MEM 14 (S256).

Then the processor invokes the movement routine for the ink data copied in S254 (S258) and executes the movement routine (S260). The movement routine is the one as illustrated in the flowchart of FIG. 19.

Then the processor draws the ink data after movement in a memory for display and displays it on the screen (S262).

In the flowchart of FIG. 27 the movement of the ink data (stroke data and voice data) was described, but the same process as the insertion of the inserting comment text and quotation symbol in the process of the text edit is carried out for the text included in the received mail. Therefore, the relative positional relation between the text data included in the received mail and the ink data is not changed between before and after the quotation process.

Figure 29:
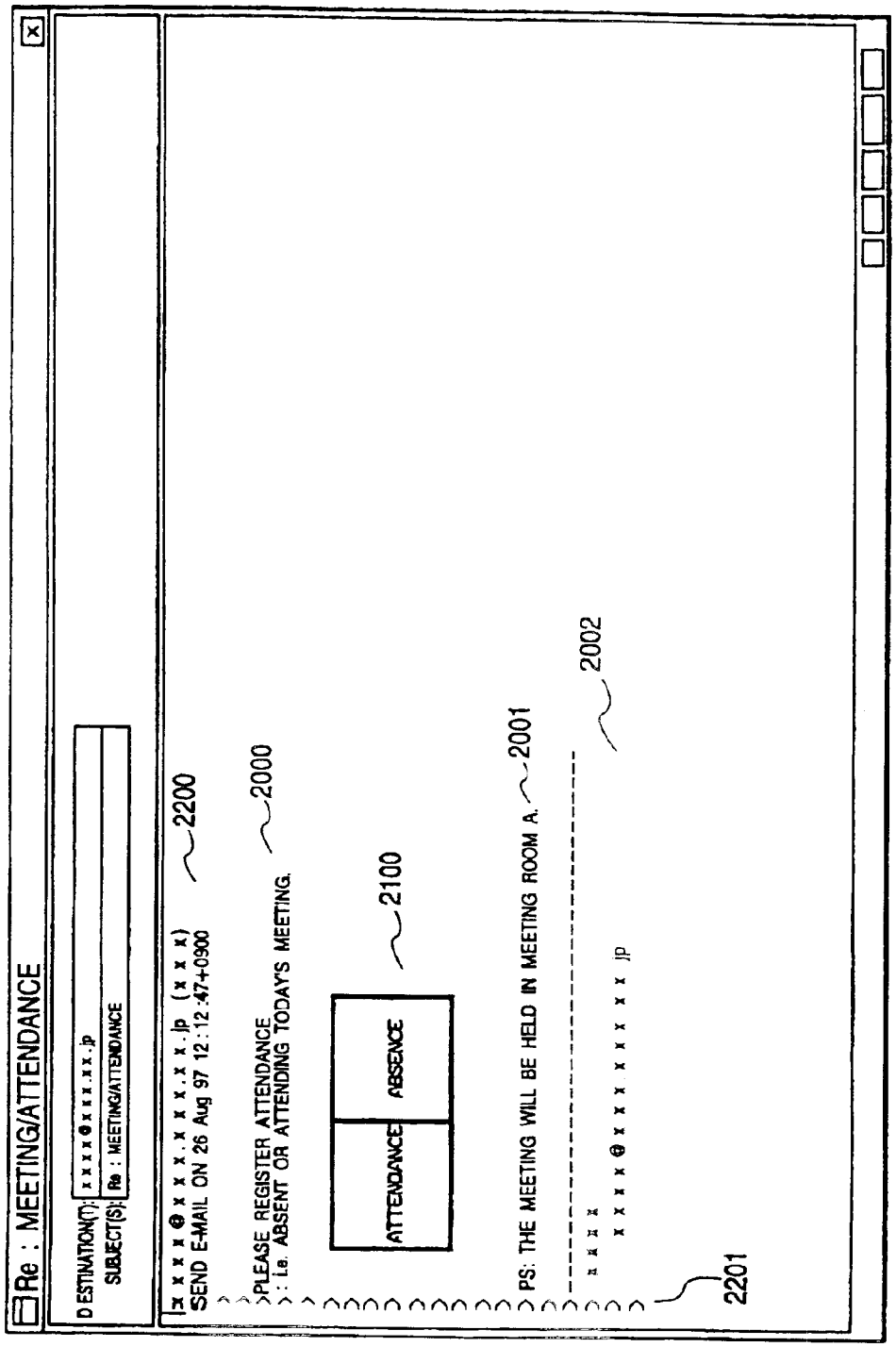
FIG. 29 is a diagram to show an example of a reply mail.

FIG. 28 illustrates a receive screen of an electronic mail. The contents of the mail are comprised of the text "Please register for attendance at the today's meeting." (2000), the stroke 2100 to indicate "attendance" and "absence," the text "PS. The meeting will be held in meeting room A." (2001), and the signature 2002 of the originator of the mail. When a reply to this mail is designated, the process of FIG. 27 is carried out to quote the contents of the received mail and to display the screen in which the inserting comment 2200 and the quotation symbol 2201 are inserted at the head and at the beginning of each line as shown in FIG. 29.

The execution of the quotation process shown in the flowchart of FIG. 27 causes no change between the relative positional relation (FIG. 28) between the text data and the ink data at the time of reception of the mail and the relative positional relation (FIG. 29) between the text data and the ink data at the time of reply to the mail.

What is claimed is:

1. A computer-executable processing method comprising:
   storing a received mail document including text data and ink data, an ink image being dynamically reproduced from the ink data and overlaid on a text image reproduced from the text data when the mail document is reproduced, the ink data including coordinate information of each ink image and time information comprising a reproduction time for each ink image, a reproduction position of the ink image being defined by the coordinate information on reference coordinate axes of the received mail document, and a reproduction speed of the ink image being defined by the time information, the text data is non-ink data;
   inserting a character string to text data of a new document when a new document quoting the received mail document is prepared;
   calculating a coordinate shift amount of the dynamic reproduction position of the ink image according to a new text image reproduced from the text data to which the character string was inserted; and
   outputting, as the new document, the ink image which is overlaid on the new text image reproduced from the text data to which the character string was inserted, the dynamic reproduction of the ink image being executed based on the calculated coordinate shift amount, the coordinate information and the time information.

2. The information processing method according to claim 1, wherein the ink data comprises locus information to define the output position by coordinate values.

3. The information processing method according to claim 1, wherein said character string to be inserted is a quotation symbol.

4. The information processing method according to claim 1, wherein said character string to be inserted is an inserting comment text.

5. The information processing method according to claim 1, wherein said character string to be inserted is a character string that can be edited.

6. The information processing method according to claim 1, wherein said shift amount is length information.

7. The information processing method according to claim 1, wherein the new output document is carried out by setting said shift amount as an offset value of said received mail document.

8. The information processing method according to claim 1, wherein said shift amount is calculated according to a number of lines of the character string to be inserted and a line pitch of the document format.

9. The information processing method according to claim 1, wherein said shift amount is calculated according to a number of lines and a number of characters of the character string to be inserted and according to a line pitch and a character pitch of the document format.

10. A computer-executable processing method comprising:
    storing document information comprising locus information and text information, a locus image being dynamically reproduced from the locus information and overlaid on a text image being reproduced from the text information when the document is reproduced, the locus information including coordinate information of each locus image and time information comprising a reproduction time for each locus image, a reproduction position of the locus image being defined by the coordinate information on reference coordinate axes of the document information, and a reproduction speed of the locus image being defined by the time information, the text data is non-ink data;
    editing said text information;
    calculating a coordinate shift amount of the dynamic reproduction position of the locus image according to a new text image reproduced from the edited text information; and
    outputting the locus image which is overlaid on the new text image reproduced from the edited text information, the dynamic reproduction of the locus image being executed based on the calculated coordinate shift amount, the coordinate information and the time information.

11. The information processing method according to claim 10, wherein the calculated shift amount is a difference between a position of the text image upon output thereof without the editing and a position of the text image upon output thereof after the editing.

12. The information processing method according to claim 10, wherein said editing is insertion of a character string.

13. The information processing method according to claim 10, wherein the shift amount is coordinate data.

14. An information processing apparatus comprising:
    received mail storing means for storing a received mail document including text data and ink data, an ink image being dynamically reproduced from the ink data and overlaid on a text image reproduced from the text data when the mail document is reproduced, the ink data including coordinate information of each ink image and time information comprising a reproduction time for each ink image, a reproduction position of the ink image being defined by the coordinate information on reference coordinate axes of the received mail document, and a reproduction speed of the ink image being defined by the time information, the text data is non-ink data;
    insertion means for inserting a character string to text data of a new document when a new document quoting the received mail document is prepared;
    shift amount calculating means for calculating a coordinate shift amount of the dynamic reproduction position of the ink image according to a new text image reproduced from the text data to which the character string was inserted; and output means for outputting, as the new document, the ink image which is overlaid on the new text image reproduced from the text data to which the character string was inserted, the dynamic reproduction of the ink image being executed based on the calculated coordinate shift amount, the coordinate information and the time information.

15. The information processing apparatus according to claim 14, wherein the ink data comprises locus information to define the output position by coordinate values.

16. The information processing apparatus according to claim 14, wherein said character string to be inserted is a quotation symbol.

17. The information processing apparatus according to claim 14, wherein said character string to be inserted is an inserting comment text.

18. The information processing apparatus according to claim 14, wherein said character string to be inserted is a character string that can be edited.

19. The information processing apparatus according to claim 14, wherein said shift amount is length information.

20. The information processing apparatus according to claim 14, wherein the new output document is carried out by setting said shift amount as an offset value of said received mail document.

21. The information processing apparatus according to claim 14, wherein said shift amount is calculated according to a number of lines of the character string to be inserted and a line pitch of the document format.

22. The information processing apparatus according to claim 14, wherein said shift amount is calculated according to a number of lines and a number of characters of the character string to be inserted and according to a line pitch and a character pitch of the document format.

23. The information processing apparatus according to claim 14, wherein said output means is an ink jet printer.

24. The information processing apparatus according to claim 14, wherein said output means is a printer.

25. The information processing apparatus according to claim 14, wherein said output means is a display device.

26. An information processing apparatus comprising:
  storage means for storing document information comprising locus information and text information, a locus image being dynamically reproduced from the locus information and overlaid on a text image being reproduced from the text information when the document is reproduced, the locus information including coordinate information of each locus image and time information comprising a reproduction time for each locus image, a reproduction position of the locus image being defined by the coordinate information on reference coordinate axes of the document information, and a reproduction speed of the locus image being defined by the time information, the text data is non-ink data;
  text edit means for editing said text information;
  shift amount calculating means for generating a coordinate shift amount of the dynamic reproduction position of the locus image according to a new text image reproduced from the edited text information; and
  output means for outputting the locus image which is overlaid on the new text image reproduced from the edited text information, the dynamic reproduction of the locus image being executed based on the calculated coordinate shift amount, the coordinate information and the time information.

27. The information processing apparatus according to claim 26, wherein the calculated shift amount is a difference between a position of the text image upon output thereof without the editing and a position of the text image upon output thereof after the editing.

28. The information processing apparatus according to claim 26, wherein said editing is insertion of a character string.

29. The information processing apparatus according to claim 26, wherein the shift amount is coordinate data.

30. A storage medium for storing computer-executable process steps for an information processing method, said storage medium storing:
  code for storing a received mail document including text data and ink data, an ink image being dynamically reproduced from the ink data and overlaid on a text image reproduced from the text data when the mail document is reproduced, the ink data including coordinate information of each ink image and time information comprising a reproduction time for each ink image, a reproduction position of the ink image being defined by the coordinate information on reference coordinate axes of the received mail document, and a reproduction speed of the ink image being defined by the time information, the text data is non-ink data;
  code for inserting a character string to text data of a new document when a new document quoting the received mail document is prepared;
  code for calculating a coordinate shift amount of the dynamic reproduction position of the ink image according to a new text image reproduced from the text data to which the character string was inserted; and
  code for outputting, as the new document, the ink image which is overlaid on the new text image reproduced from the text data to which the character string was inserted, the dynamic reproduction of the ink image being executed based on said calculated coordinate shift amount, the coordinate information and the time information.

31. A storage medium for storing computer-executable process steps for an information processing method, said storage medium storing:
  code for storing document information comprising locus information and text information, a locus image being dynamically reproduced from the locus information and overlaid on a text image being reproduced from the text information when the document is reproduced, the locus information including coordinate information of each locus image and time information comprising a reproduction time for each locus image, a reproduction position of the locus image being defined by the coordinate information on reference coordinate axes of the document information, and a reproduction speed of the locus image being defined by the time information, the text data is non-ink data;
  code for editing said text information;
  code for calculating a coordinate shift amount of the dynamic reproduction position of the locus image according to a new text image reproduced from the edited text information; and
  code for outputting the locus image which is overlaid on the new text image reproduced from the edited text information, the dynamic reproduction of the locus image being executed based on the calculated coordinate shift amount, the coordinate information and the time information.

* * * * *